(12) United States Patent
Shvets et al.

(10) Patent No.: US 12,292,380 B2
(45) Date of Patent: May 6, 2025

(54) INTEGRATED MICROFLUIDIC DEVICE FOR CAPTURE AND SPECTROSCOPIC CHARACTERIZATION OF LIVE CELLS UNDER VARIOUS TREATMENT CONDITIONS

(71) Applicant: CORNELL UNIVERSITY, Ithaca, NY (US)

(72) Inventors: Gennady Shvets, Ithaca, NY (US); Glen Kelp, Ithaca, NY (US); He Huang, Ithaca, NY (US)

(73) Assignee: Cornell University, Ithaca, NY (US)

( * ) Notice: Subject to any disclaimer, the term of this patent is extended or adjusted under 35 U.S.C. 154(b) by 774 days.

(21) Appl. No.: 17/262,347

(22) PCT Filed: Jul. 25, 2019

(86) PCT No.: PCT/US2019/043439
§ 371 (c)(1),
(2) Date: Jan. 22, 2021

(87) PCT Pub. No.: WO2020/023747
PCT Pub. Date: Jan. 30, 2020

(65) Prior Publication Data
US 2021/0302312 A1    Sep. 30, 2021

Related U.S. Application Data
(60) Provisional application No. 62/702,963, filed on Jul. 25, 2018.

(51) Int. Cl.
*G01N 21/552*    (2014.01)
*B01L 3/00*    (2006.01)
(Continued)

(52) U.S. Cl.
CPC ...... *G01N 21/554* (2013.01); *B01L 3/502715* (2013.01); *G01N 21/35* (2013.01);
(Continued)

(58) Field of Classification Search
CPC ................. G01N 21/554; G01N 21/35; B01L 3/502715; B01L 2300/0663; G02B 5/008;
(Continued)

(56) References Cited

U.S. PATENT DOCUMENTS

| | | |
|---|---|---|
| 6,268,662 B1 | 7/2001 | Test et al. |
| 2012/0154793 A1* | 6/2012 | Pryce ................ G01N 21/3581 356/128 |

(Continued)

OTHER PUBLICATIONS

Xin et al. "Metamaterial Absorber Integrated Microfluidic Terahertz Sensors", University of Glasgow, Mar. 3, 2017, p. 1-22. (Year: 2017).*

(Continued)

*Primary Examiner* — Dani Fox
*Assistant Examiner* — Mamadou Faye
(74) *Attorney, Agent, or Firm* — Barnes & Thornburg

(57) ABSTRACT

A detection unit, device, and system for cell capture, spectral analysis, and drug interaction monitoring. The detection unit includes an IR-transparent substrate connected to a plasmonic metasurface with an array of metallic antennas. In a detection device, the detection unit is connected to a microfluidic chamber with a channel such that the channel extends along the metasurface. For the detection system, the detection device is mounted on a microscope. The infrared spectra are collected in reflection, with infrared light impinging on the metasurface from the substrate side and returning back through the substrate in the form of reflected infrared light. The system includes a syringe pump for injecting live cells into the chamber. An AC source is connected to the metasurface for cell capture and its AC voltage creates a dielec- (Continued)

trophoretic (DEP) force that causes the live cells to move from the chamber and onto the metasurface for spectral analysis.

22 Claims, 25 Drawing Sheets

(51) Int. Cl.
  *G01N 21/35* (2014.01)
  *G02B 5/00* (2006.01)
  *G02B 21/06* (2006.01)
  *G02B 21/36* (2006.01)

(52) U.S. Cl.
  CPC .............. *G02B 5/008* (2013.01); *G02B 21/06* (2013.01); *B01L 2300/0663* (2013.01); *G02B 21/36* (2013.01)

(58) Field of Classification Search
  CPC ........ G02B 21/06; G02B 21/36; G02B 21/34; G02B 27/42
  See application file for complete search history.

(56) References Cited

U.S. PATENT DOCUMENTS

| | | | | |
|---|---|---|---|---|
| 2013/0148194 | A1* | 6/2013 | Altug | G01N 21/658 977/932 |
| 2016/0003817 | A1* | 1/2016 | Chou | G01N 21/6486 422/69 |
| 2016/0178523 | A1* | 6/2016 | Nagatomi | B01L 3/5027 422/69 |
| 2016/0282264 | A1 | 9/2016 | Wagner | |
| 2018/0024412 | A1* | 1/2018 | Kim | G02F 1/292 359/315 |
| 2018/0071738 | A1* | 3/2018 | Blainey | B01L 3/502761 |
| 2019/0353830 | A1* | 11/2019 | Kildishev | G11B 7/1381 |
| 2020/0306757 | A1* | 10/2020 | Lee | C12Q 1/6806 |

OTHER PUBLICATIONS

Chia-Yun et al. "Efficient Metamaterial-based plasmonic sensors for micromixing evaluation", 2016 IOP Publishing Ltd, p. 1-7 (Year: 2016).*

Thu et al. "Plasmonics-Nanofluidics Hydrid Metamaterial: An Ultrasensitive Platform for Infrared Absorption Spectroscopy and Quantitative Measurement of Molecules", ACS Publications, ACS Nano 2017, p. 9780-9788. (Year: 2017).*

Hamid et al. "Patterned Plasmonic Surfaces—Theory, Fabrication, and Applications in Biosensing", IEEE 2017, p. 718-739 (Year: 2017).*

Nihal "Fano-Resonant Plasmonic Metasurface for Cancer Detection using Few-Cell Spectroscopy and Other Optical Applications in Mid-Infrared", The University of Texas at Austin, Aug. 2016, p. 1-185. (Year: 2016).*

International Search Report and Written Opinion for International Application No. PCT/US2019/043439 dated Oct. 10, 2019; 9 pages.

Giannini, Vincenzo, et al., Plasmonic Nanoantennas: Fundamentals and Their Use in Controlling the Radiative Properties of Nanoemitters, Chemical Reviews, 2011 Plasmonics, published Mar. 24, 2011, pp. 3888-3912.

Shvets, Gennady B., et al., Circulating tumor cells enrichment and phenotyping by combining dielectrophoresis and metasurface-enhanced infrared spectroscopy (Conference Presentation) Proceedings vol. 10489, Optical Biopsy XVI: Toward Real-Time Spectroscopic Imaging and Diagnosis, Mar. 14, 2018.

* cited by examiner

INTEGRATED MICROFLUIDIC DEVICE FOR CAPTURE AND SPECTROSCOPIC CHARACTERIZATION OF LIVE CELLS UNDER VARIOUS TREATMENT CONDITIONS

CROSS REFERENCE

This application is a U.S. National Phase filing of International Application No. PCT/US19/43439 filed Jul. 25, 2019, which claims priority to U.S. Provisional Patent Application Ser. No. 62/702,963, filed on Jul. 25, 2018 and entitled "Integrated Microfluidic Device for Capture and Spectroscopic Characterization of Live Cells," the entirety of each of which are incorporated herein by reference.

BACKGROUND OF THE INVENTION

1. Field of the Invention

The present invention is directed generally to an infrared spectroscopy detection device and system and, more particularly, to a microfluidic-integrated infrared spectroscopy device and system for cell capture, spectral analysis, and drug interaction monitoring.

2. Description of Related Art

There are numerous problems with current cytological methodologies. For example, it is well known that cytology-based screening of cancer, for example, lacks sensitivity, which is presently in the 30%-87% range. For many specific diseases, such as cervical cancer, both sensitivity and specificity of cervical cytology are low. Therefore, there is a strong need to obtain additional, more sensitive, biochemical information from IR spectroscopy. Consequently, various spectroscopic modalities have been developed over the years. For example, the IR spectra of skin cells were used for rapid label free identification of skin malignancies. Unfortunately, most of these modalities suffer from serious limitations that prevent their widespread clinical application.

Most spectral characterization has been performed on cells that are fixed or dried. The validity of such measurements has been called into question, and many applications (such as, for example, measurements of time-dependent drug effects) are simply impossible when the cells are already dead. Spectroscopic measurements of live cells in their natural aqueous environment have been done before, but mostly with cells that are grown on a substrate. Examples of such measurements include ATR-FTIR (attenuated total reflection FTIR) measurements of cells that grown on a surface of high-index prisms. Monolithic microfluidic chambers of extremely shallow depth (under 10 microns) have also been deployed for transmission IR spectroscopy of living cells. However, the extremely shallow depth of the channels can impose mechanical stress on the cells, and water absorption is a significant problem. Besides, the shallow channel prevents high throughput operation because large amounts of fluids cannot be passed through it within a reasonable time period. Such throughput would be necessary, for example, if the cells obtained from a fine needle aspiration biopsy (FNAB) injected into cell culture medium were to be examined using infrared spectroscopic cytology.

The most common approach to cytopathology is staining of the exfoliated cells using various contrast agents. The goal is to observe the morphology of the cells. This technique requires a highly trained pathologist, and is somewhat subjective. This methodology is inherently limited to subjective interpretations of nuclear integrity, cellular size and structure, and stain uptake. Diagnosis by analysis of morphology is further complicated by low-grade dysplasia or pre-cancerous samples, in which the majority of the cells have yet to take on the structural characteristics of disease necessary for rendering a diagnosis. High-grade dysplastic samples are also complicated, as diagnosis is dependent on eyeing the presence of very few morphologically abnormal cells among a large number of cells with relatively normal morphology.

On the other hand, spectral cytopathology (SCP) provides a non-destructive label-free photonic approach, which takes a rapid measurement of a sample's biochemistry and identifies variations that occur between healthy and diseased specimens. SCP uses compositional molecular signatures, rather than the distribution of stains and cellular or nuclear morphology for diagnosis. The molecular signatures are captured through a global spectroscopic measurement, and the changes in spectral patterns are analyzed through multivariate statistical methods (e.g., Principal Components Analysis, or PCA). The advantage that SCP has over conventional microscopy is the ability to provide an objective and reproducible diagnosis, independent of fatigue, experience, inter-observer variability, and vague morphological changes.

Unfortunately, performing SCP is quite challenging. Most of the SCP work to date has been done with dried and/or fixed cells. But fixation and drying is known to introduce a variety of scattering artefact, as well as suffer from inconsistencies related to different sample preparations. Live cells spectroscopy is less common. It has been performed using ATR-FTIR in open-channel devices that suffer from water evaporation. ATR-FTIR is typically performed using high index prism made of materials such as Ge, ZnSe, etc. Such prisms are rather expensive and cannot be envisioned as single-use devices. Metallic structures (the so-called low-E glass microscope slides with IR-reflective metallic coating on the back side) have also been used in the so called transflectance geometry where IR light propagates through the monolayer of cells, reflects off the back of the slide, and then propagates through the cells for the second time. However, such geometry also requires that the cells be fixed or dried.

Transmission mode MIR spectroscopy has been also carried out, mostly using synchrotron sources. Relatively long preparation of cell monolayers is typically required even for adherent cells. SCP of non-adherent cells has not been performed so far. That rules out SCP of myeloid and lymphoid lineages of blood cells. Thus, there is a need for a system and method for spectral analysis of different types of cells, including live cells, for differentiation and drug development.

Traditionally, early drug discovery has been based on target-focused approaches, which use radiolabeled or fluorescent probes to report the effect of different compounds on a specific target in in vitro assays. However, such target-focused screening has faced continuous decline in productivity over the past years due to a number of challenges. First, the chemical conjugation of a "label" to the drug molecule or the drug target may affect the functionality of the compounds, altering the drug-target interaction. Second, the effect of drugs on the cellular system is often very complicated and there is a lack of understanding of the molecular basis of drug mode of action as well as all of the related signaling pathways in the target cells. In particular, many drug molecules can interact with more than one target, suggesting that monitoring a single drug target may not capture the entire functionality of the drug. Also, drugs can also cause unwanted toxicity through its interaction with other cellular pathways, causing adverse drug reactions. In addition, the chosen target to be labelled may not be essential in the pathological process, leading to the lack of efficacy in clinical trials.

Label-free phenotypic screening re-emerged as a promising alternative to target-based assays in the recent years. In phenotypic screening, instead of measuring the change in a particular target molecule, a variety of cellular parameters, such as cell adhesion, proliferation, and cellular morphology are measured through an integrated readout in real-time. There are currently two types of technologies for label-free phenotypic screening, based on electrical impedance measurement or optics measurement. Impedance-based technologies include products such as xCELLigence (ACEA Biosciences) and ECIS (Applied Biophysics), which use a microelectrode at the bottom of the cell culture plate to measure changes in the flow of electric current as the cell coverage on the plate changes. On the other hand, optics-based technologies include products such as EPIC (Corning), which use a resonant optical grating at the bottom of the culture plate to measure the change in reflectance from the optical grating, which reflects the dynamic mass redistribution in the cells above. Although these two technologies measure very different physical signal (electrical impedance vs. optical reflectance), both reflect the change in cell adhesion, proliferation, and morphology, which is often translated to a single index that represents the sensor's response. It has been demonstrated that by measuring such response, a surprisingly broad categories of changes in cell can be monitored, including not only cell adhesion and proliferation, but also receptor signaling, cytotoxicity, as well as cell differentiation.

When applied to drug screening, phenotypic screening offers a sensitive and less-invasive alternative that addresses some of the challenges faced by target-based screening. Phenotypic screening is inherently free of fluorescent labeling, which allows for the monitoring of cells in a more physiologically relevant condition. Also, phenotypic screening monitors an integrated signal from the whole cell instead of a particular target, thus covering many pathways at the same time, allowing for multi-target screening.

Monitoring of live cells using FTIR spectroscopy to look at the effect of drugs has been conducted. However, the cells have only been measured using either attenuated total reflection-FTIR or in transmission mode using a thin fluidic device. These techniques are more suitable for measuring the IR spectra from the whole cell. Thus, there is still a need for a device and/or technique that is more sensitive to the part of the cell close to the underlying metasurface (within 100 nm); i.e. the cell membrane compositions and the expression of different membrane proteins, as well as cell's adhesion and mobility.

Therefore, there is a need for a device for capturing live cells and analyzing their spectra for cell characterization and determining the effects of certain drugs in targeted therapies.

Description of the Related Art Section Disclaimer: To the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

The present invention includes a new approach to cytopathology (also frequently referred to as cytology)—the science of detecting pathological features of single cells, including their transition to cancerous and precancerous conditions—that relies on spectroscopic data obtained from coupling mid-infrared (MIR) light to vibrational modes of the constituent molecules (proteins, lipids, etc.). Briefly, infrared spectroscopic cytology is based on the quantification of vibrational fingerprints of cell's constituent molecules (for example, proteins, lipids, phospholipids, etc.). The biochemical cell's fingerprint associated with the mid-infrared part of the electromagnetic spectrum which overlaps with molecular vibrations ($\omega_r$=900-1800 cm$^{-1}$) provides a representation of the cellular structure/function based on chemical bond vibrations and provides an excellent (potentially clinical) tool for distinguishing between different cell types and populations.

The present invention also includes a new form of phenotypic screening based on metasurface-enhanced IR reflection spectroscopy (MEIRS), measuring the IR absorption of cells at a nanopatterned surface, engineered to enhance the IR absorption signal. The total IR absorption of the cells and the shift of metasurface resonance provide information that is similar to that of dynamic mass redistribution measured through optics-based phenotypic assays, related to cell adhesion, proliferation, and mobility. As stated above, IR spectroscopy can identify the absorption of proteins, lipids, phospholipids, etc. separately, thus providing much more information than previous optics-based assays. For example, from end point IR spectroscopy of cells, it is possible to determine the mode of action of different drugs, as well as distinguish between cells from different tissues. This additional information from IR spectroscopy, when combined with machine learning algorithms for processing big data, can identify smaller changes in cells that are not observable from either optics nor impedance-based phenotypic assays. At the same time, IR spectroscopy would be able to provide more information on the kind of change happening in the cell (e.g., a change in the proteins or the lipids or a change in the protein secondary structure). This, in turn, can help researchers better understand the cellular pathways involved and increase the efficiency of the early drug screening process.

Also, we believe that the enhancement in IR absorption provided by the metasurface allows for the collection of IR spectra with better signal-to-noise ratio and shorter acquisition time, which is crucial for a high efficiency cellular assay. In addition, the shift of metasurface resonance, analogous to the signal obtained from optical grating based assays, can be used as an additional signal channel as well, and thus allowing our technique to simultaneously perform IR absorption measurement and refractive index (or dynamic mass redistribution) measurement, combining FTIR technique with optical grating based cellular assays.

Embodiments of the present invention are directed to a detection unit, detection device, and detection system for spectra analysis of cells. According to one aspect, the present invention is detection unit. The detection unit includes an IR-transparent substrate connected to a plasmonic metasurface. The plasmonic metasurface comprising an array of metallic plasmonic wires.

According to another aspect, the present invention is a detection device. The detection device includes a unit comprising a substrate attached to a metasurface. The metasurface has a plurality of wires extending therethrough. The unit is connected to a microfluidic chamber. The microfluidic chamber has a microfluidic channel. The microfluidic chamber is connected to the metasurface such that the microfluidic channel extends along the metasurface.

According to yet another aspect, the present invention is a detection system. The detection system includes a unit having a substrate attached to a metasurface. The metasurface has a plurality of wires extending therethrough. The detection system also includes a microfluidic chamber with a microfluidic channel. The microfluidic chamber is connected to the metasurface such that the microfluidic channel extends along the metasurface. In addition, the detection system includes an AC source connected to the plurality of wires in the metasurface. Further, the detection system has a microscope positioned above the unit. The microscope is configured to emit IR light at the metasurface and collect IR light reflected from the metasurface.

These and other aspects of the invention will be apparent from and elucidated with reference to the embodiment(s) described hereinafter.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1:
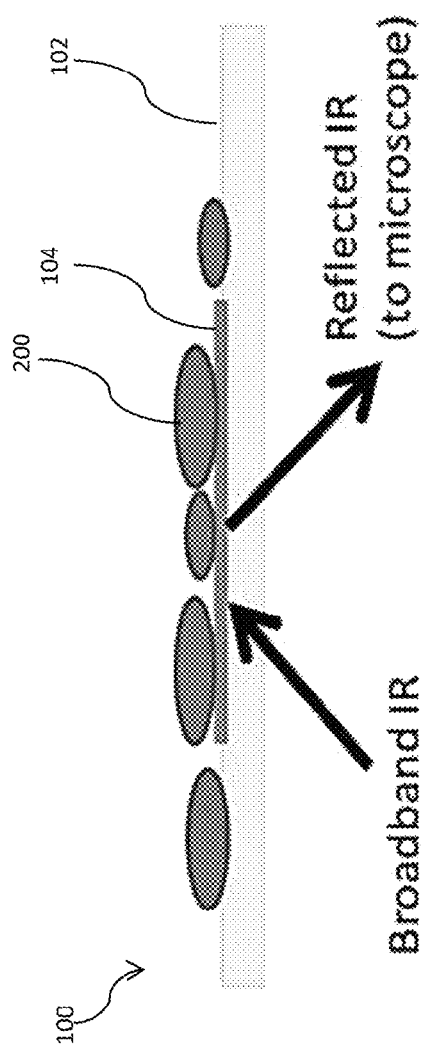
FIG. 1 is a side view schematic representation of a detection unit, according to an embodiment.
Figure 2:
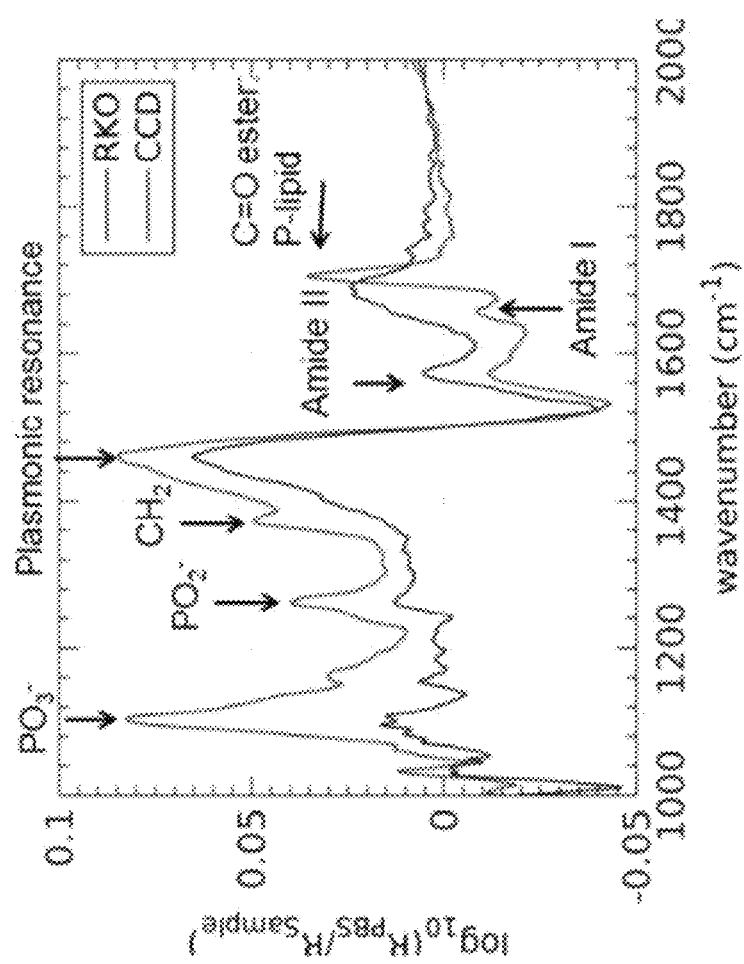
FIG. 2 is a graph showing an exemplary spectra of normal (CCD) and cancer (RKO) epithelial colon cells.

Referring now to the figures, wherein like reference numerals refer to like parts throughout, FIG. 1 there is shown a side view schematic representation of a detection unit 100, according to an embodiment. The detection unit 100 comprises a metasurface 102 integrated with (or otherwise functionally attached to) a substrate 104. In the depicted embodiment, the metasurface 102 is a plasmonic metasurface and the substrate 104 is an IR-transparent substrate, such as $CaF_2$ (or any other similar suitable material). Generally, in use, cells 200 ("sample") are placed on the substrate 104 and the spectra are collected using an IR microscope coupled to a FTIR spectrometer. Spectral differences, such as the exemplary spectra show in FIG. 2, can be used to differentiate between normal (CCD) epithelial colon cells and cancer (RKO) epithelial colon cells, for example.

Figure 3:
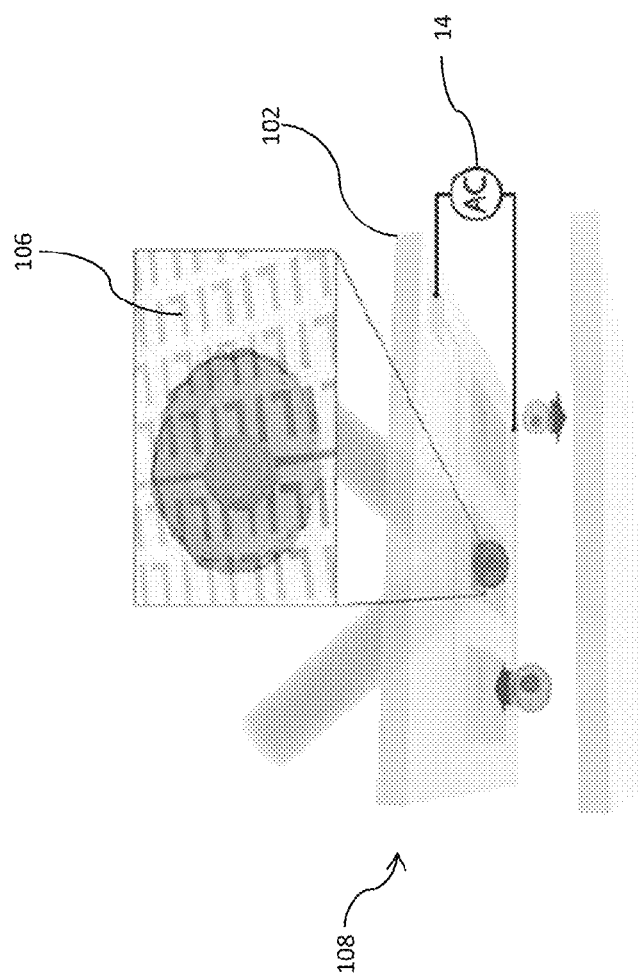
FIG. 3 is a side perspective view schematic representation of the metasurface, according to an embodiment.
Figure 4:
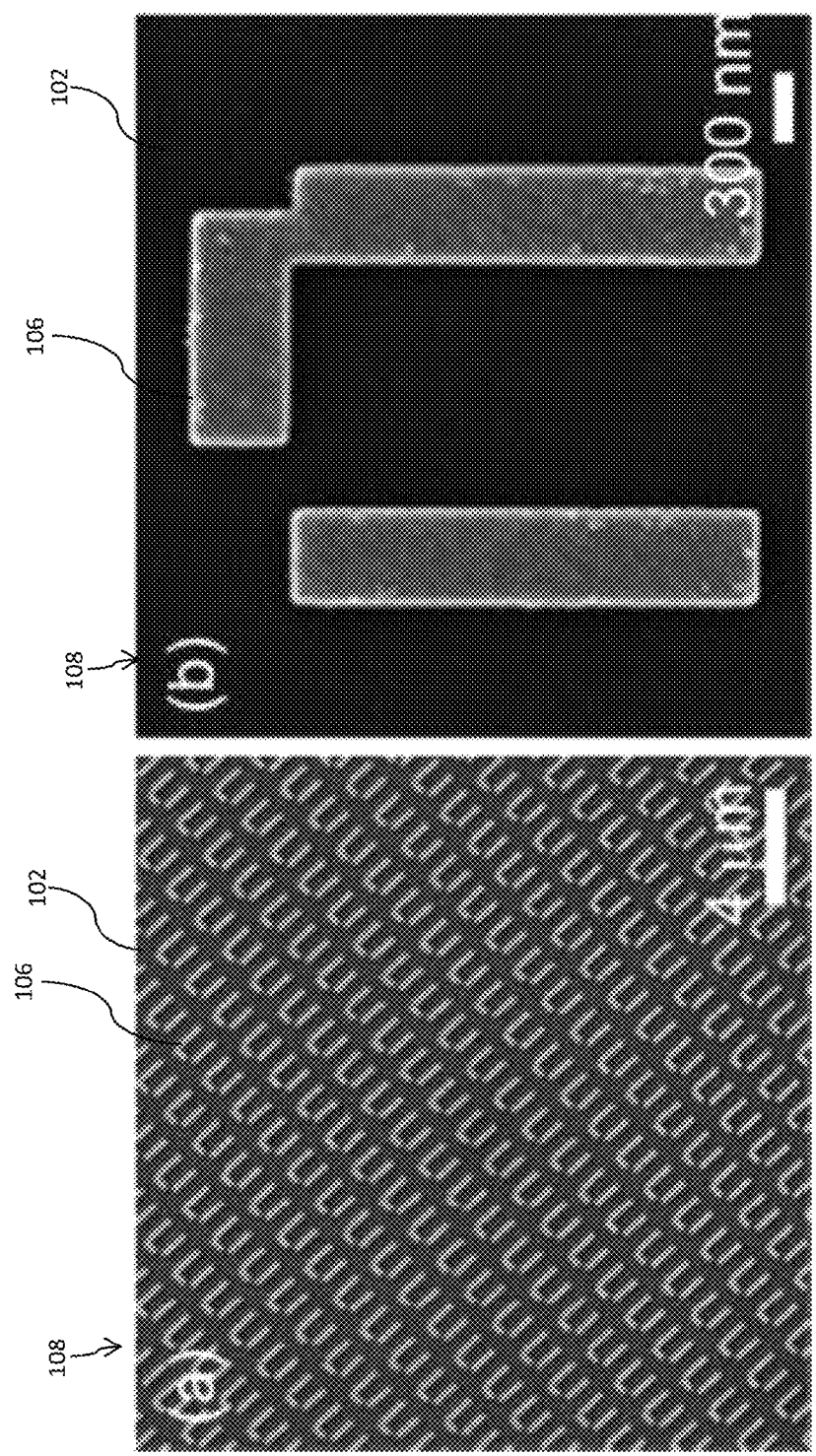
FIG. 4 shows exemplary metasurfaces with wires.

Turning briefly to FIG. 3, there is shown a side perspective view schematic representation of the metasurface 102, according to an embodiment. In the depicted embodiment, the plasmonic metasurface 102 comprises an array of metallic plasmonic wires 106 dispersed throughout. In an embodiment, the metallic plasmonic wires 106 are specially designed gold nanoantennas. The metasurface 102 and the metallice plasmonic wires 106 form a meta-electrode 108. Examples of the metasurface 102 with metallic plasmonic wires 106 are shown in FIG. 4. The meta-electrode 108 performs both an optical biosensing function and a cells attraction function, as discussed in detail below.

Figure 6:
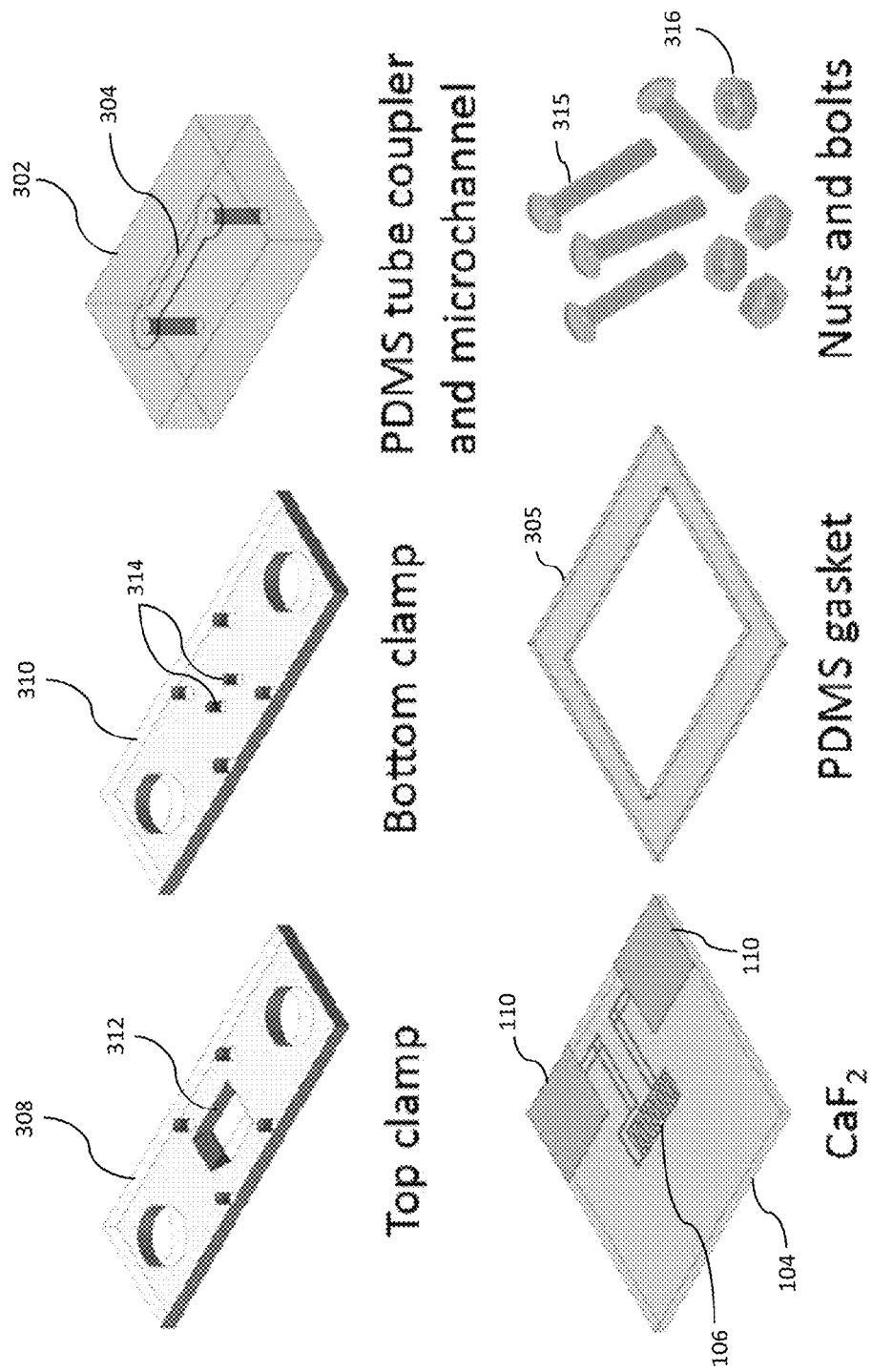
FIG. 6 is a perspective view schematic representation of the components of the detection device, according to an embodiment.
Figure 7:
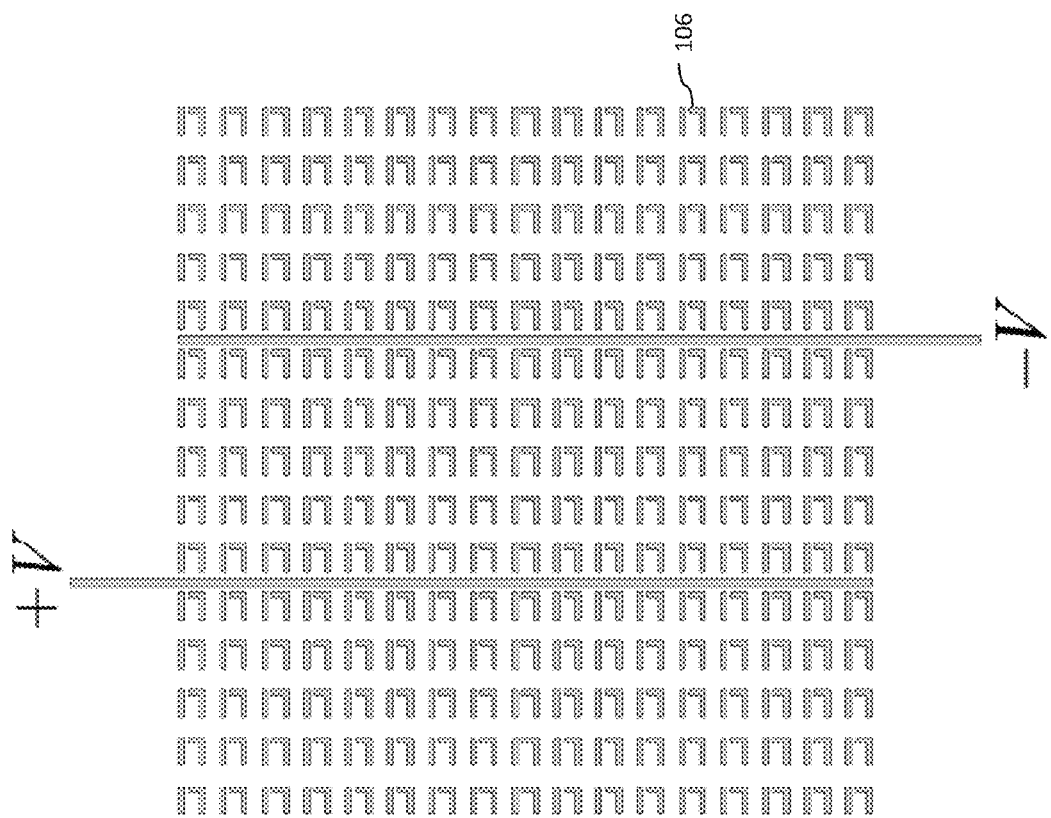
FIG. 7 is an interdigitated wiring schematic for a meta-electrode, according to an embodiment.
Figure 8:
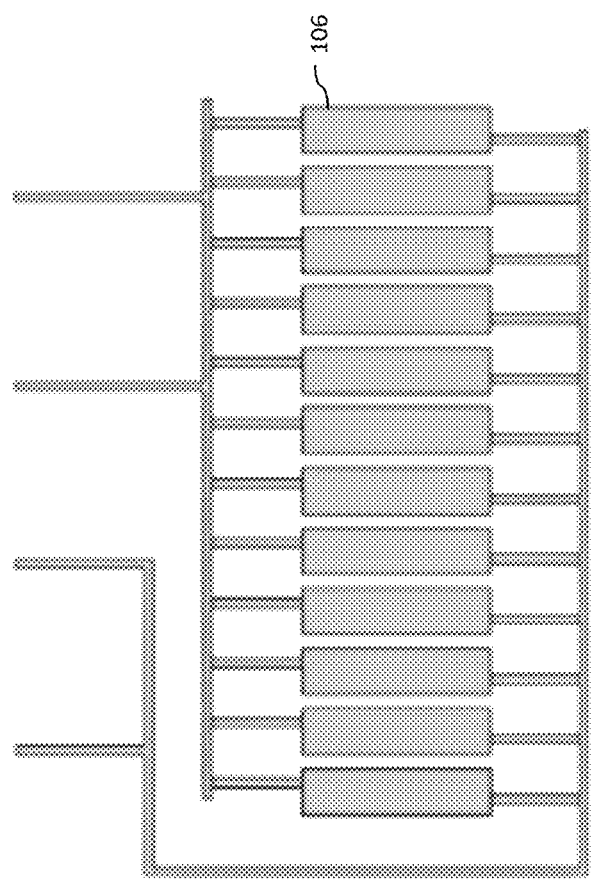
FIG. 8 is another interdigitated wiring schematic for a meta-electrode, according to an alternative embodiment.

In one embodiment, the plasmonic metasurfaces 102 with wires 106 for external electrical connection is fabricated using electron beam lithography methods. For example, e-beam resist PMMA 495 k A4 is spin-coated onto IR-transparent $CaF_2$ substrates 104 (12.5×12.5 mm$^2$), exposed by e-beam on JEOL JBX9500FSZ, and developed in MIBK: IPA (1:3) solution. 70 nm of gold is evaporated onto the substrates 104 with a 10 nm chromium adhesion layer, followed by a lift-off process. Large gold contacts are evaporated onto the edges of the substrates 104, connecting through wires 106 with electrodes in each metasurface pixel. Wires 106 are attached to contact pads 110 with electrically conductive silver glue, as shown in FIG. 6. This biasing arrangement dispenses with ITO and biases adjacent wires 106 running through the metasurface 102 in an interdigitated arrangement. Schematics of the interdigitated arrangement of the wires 106 are shown in FIGS. 7 and 8.

In the embodiment shown in FIG. 5, the same electrodes discussed above in connection with FIG. 6, are attached to all wires 106 running through the metasurface 102 (one polarity) and to an ITO counterelectrode (the opposite polarity) placed below the microfluidic channel 304, resulting in a biasing arrangement. Its drawback is the need for a second conductive and transparent counter-electrode 306 placed opposite to the meta-electrode 108.

In the embodiment shown in FIG. 6, multiple (e.g., 12) metasurface pixels are on the $CaF_2$ substrate 104, with 4 different metasurface designs represented, 3 repetitions of each. Each design is repeated for redundancy, to protect against sporadic fabrication errors and increase the area where cells can be captured. The 4 different metasurface 102 designs differ in scaling of the unit cells, which shifts the spectral position of metasurface resonances: increasing dimensions redshift the resonances. Pixels with the largest scaling factor were found to be useful for collecting cell spectra in this work since the metasurface resonances (and hence its field enhancement) overlap more with the strongest molecular vibrations of cell constituent molecules (amide I and II). Other designs provide the opportunity to investigate different spectral regions.

Figure 5:
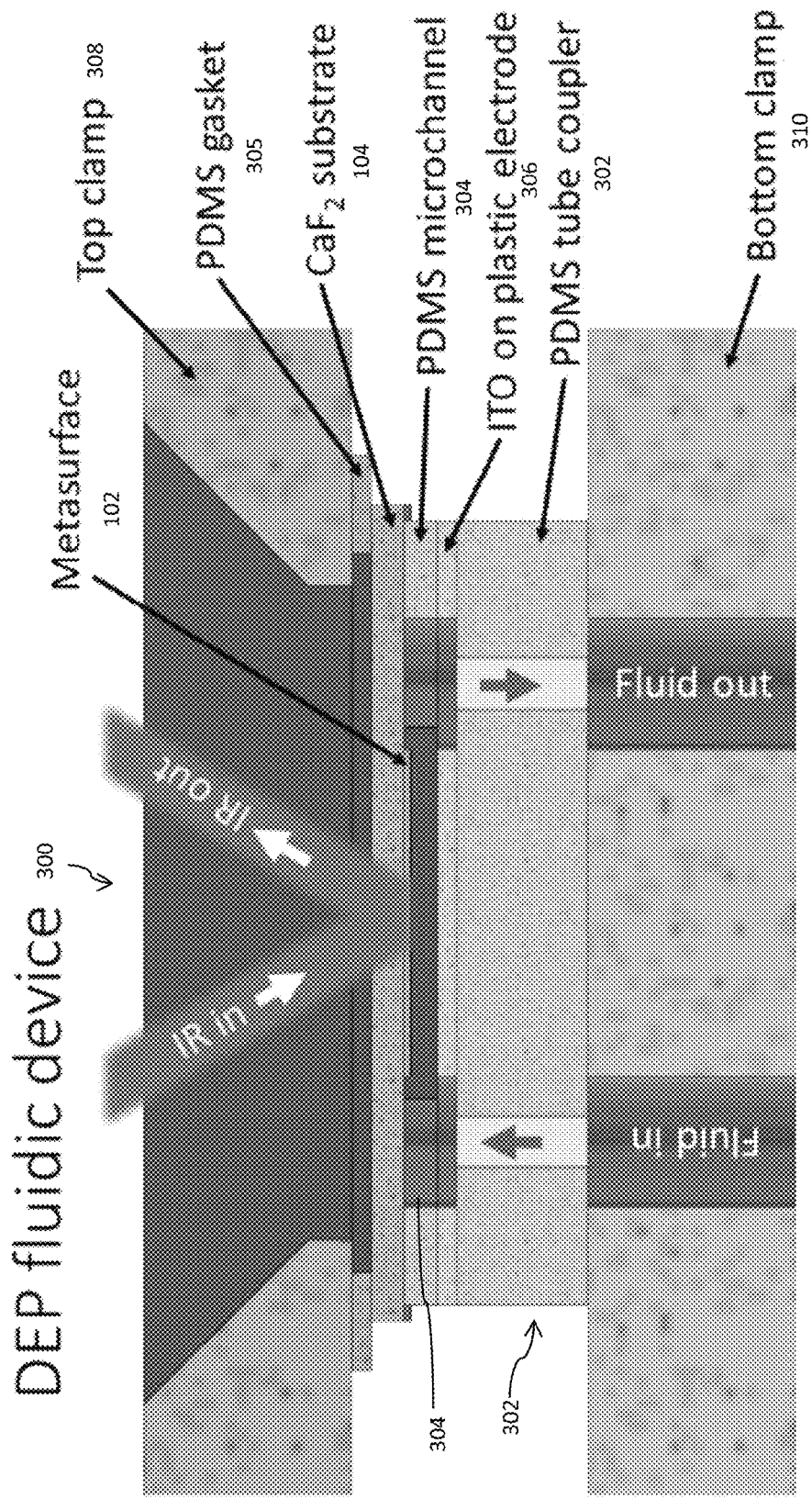
FIG. 5 is a side view schematic representation of a detection device, according to an embodiment.

Referring now to FIG. 5, there is shown a side view schematic representation of a detection device 300, according to an embodiment. The meta-electrode 108 described above is integrated with a microfluidic chamber 302 via the substrate 104. The microfluidic chamber 302 is configured to receive biological material. Specifically, the microfluidic chamber 302 is configured to receive live cells and deliver them to the detection unit 300, specifically, the meta-electrode 108. In one embodiment, the detection device 300 is single-use such that a new detection device 100 is used for a new sample of biological material. In an embodiment, the microfluidic chamber 302 comprises one or more microfluidic channels 304 for delivering the live cells to the meta-electrode 108.

In an embodiment, the microfluidic channel 304 has a length of 8 mm, width of 500 um, and height/depth of 64 um. The microfluidic channel 304 can be fabricated using known processes, such as a standard polydimethyl siloxane (PDMS) soft lithography process. For example, PDMS (e.g., Dow Sylgard 184) is mixed in 5:1 base to cross-linker ratio, poured onto a mold, degassed in a vacuum to remove bubbles, and heat-treated in a 65° C. oven for 16 hours. The PDMS is then cut into a shape to fit onto the substrate 104 (e.g., CaF2). Inlet and outlet ports can be created in the PDMS chamber ("block") 302 with a hole-puncher. Finally, Polyethylene tubing (e.g., PE-20, Instech) can be inserted into the inlet and outlet ports in the PDMS chamber 302. An exemplary embodiment of the PDMS microfluidic chamber 302 is shown in FIG. 6.

Once the PDMS microfluidic chamber 302 is created, it must be attached to the substrate 104. Well-known methods exist for permanently bonding glass (SiO2) and PDMS for microfluidic use, but in this case, the substrate 104 is $CaF_2$, which complicates the bonding procedure. An alternative method of depositing a thin silicon layer onto the $CaF_2$ substrate 104 and using native oxide on the surface of Si for bonding the $CaF_2$ 104 to the PDMS chamber 302 also exists. However, it is a preferred method where the $CaF_2$ substrate 104 and PDMS chamber 302 are kept in tight contact is by mechanical clamping using conventional connectors, such as metal screws.

According to the embodiment shown in FIG. 5, custom-made acrylic slides 308, 310 ("clamps") are used for holding the $CaF_2$ substrate 104 and PDMS chamber 302 together. They slides 308, 310 also provide a convenient way to mount the sample under microscopes because they can be fitted into standard microscope slide holders. Metasurface pixels on the $CaF_2$ substrate 104 are aligned with the microfluidic channel 304 and the two pieces (the detection unit 100 and the microfluidic chamber 302) are clamped together with the two acrylic slides 308, 310 (FIG. 6). The two slides 308, 310 can be cut from 3 mm thick acrylic using a laser cutter. The top slide 308 touching the $CaF_2$ substrate 104 has a window 312 to allow IR light to be transmitted to the sample unobscured, while the bottom slide 310 touching the PDMS chamber 302 has through-holes 314 for the tubing, as shown in FIG. 6.

Figure 9:
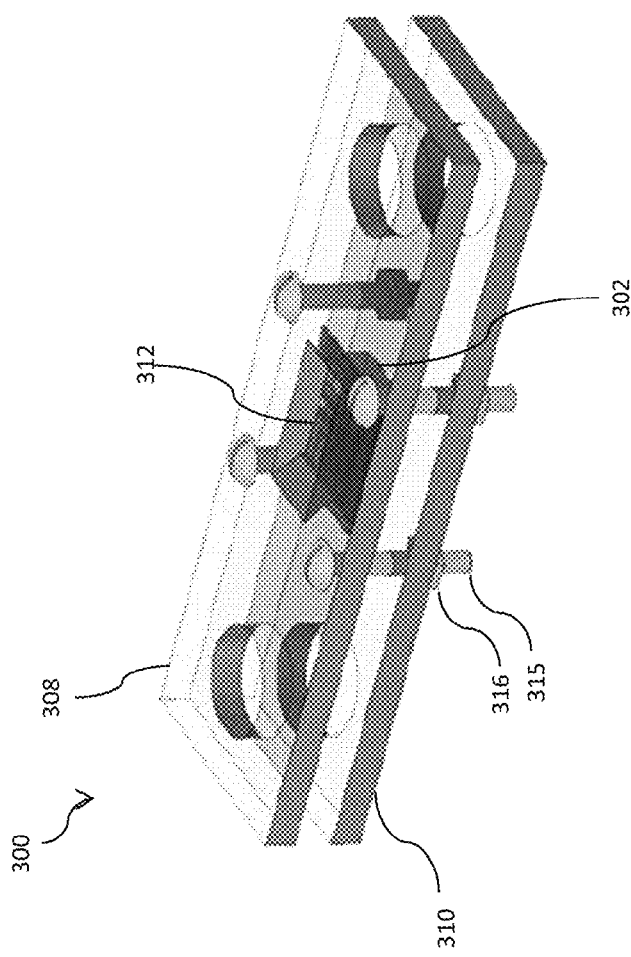
FIG. 9 perspective view schematic representation of the detection device, according to an embodiment.

The two acrylic slides 308, 310 can be tightened together using conventional connectors, such as screws 315 and nuts 316 (FIG. 6), resulting in the configuration of the detection device 300 shown in FIG. 9. Only a minimal amount of pressure is applied while tightening the clamp, i.e., relative position of the top acrylic slide 308 to the bottom acrylic slide 310, to ensure that the PDMS chamber 302 and the $CaF_2$ substrate 104 will not separate while fluid is pumped into the microfluidic channel 304. Excessive pressure could damage $CaF_2$ substrate 104 or deform the microfluidic channel 304. In an embodiment shown in FIG. 5, a PDMS gasket 305 (also shown in FIG. 6) is used to protect the $CaF_2$ 104 substrate and is positioned between the top slide 308 and the $CaF_2$ 104 substrate. The microfluidic (PDMS) chamber 302 has a single microfluidic channel 304 (FIG. 6), but multiple microfluidic channels 304 can be outfitted on a single detection device 300. The microfluidic channel 304 is located or otherwise positioned adjacent to the meta-electrode 108.

Figure 13:
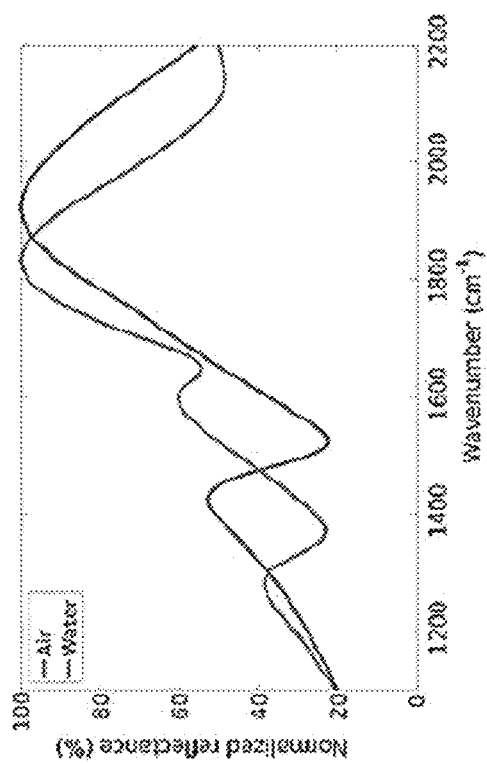
FIG. 13 is a graph of a typical reflectivity spectra from a bare metasurface in air and in water.

As mentioned above, the purpose of the microfluidic chamber 302 is to receive live cells and deliver them to the meta-electrode 108. The live cells are preferably injected in the microfluidic chamber 302. In use, an AC electric field is applied to the metallic wires 106 inside the meta-electrode 108. For example, in the embodiment shown in FIG. 3, an AC source 14 is integrated with the metasurface 12, comprising the meta-electrode 108. In that embodiment, the meta-electrode 108 serves as an IR sensor and an electrode. In FIG. 3, the AC voltage is applied between adjacent wires 106 in each meta-electrode 108. The applied electric field creates a dielectrophoretic (DEP) force that causes live cells to move from the microfluidic chamber 302 and onto the metasurface 102. With the live cells on the metasurface 102, their spectra can be collected using Metasurface-Enhanced Infrared Reflection Spectroscopy (MEIRS), as described below. An exemplary typical reflectivity spectra of the metasurface 102, without any cells, in air and in water is shown in FIG. 13 for comparison to the spectra when the metasurface 102 comprises cells.

Figure 10:
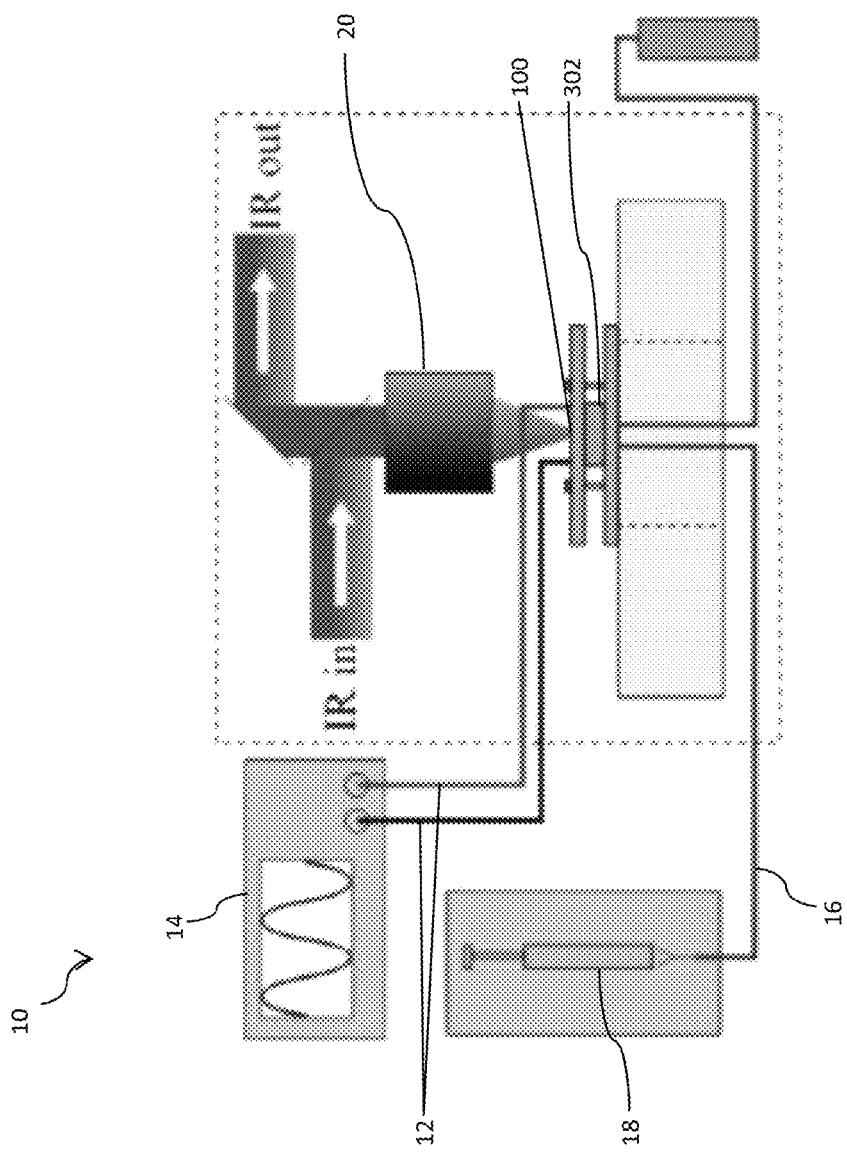
FIG. 10 is a schematic representation of a detection system, according to an embodiment.

Turning now to FIG. 10, there is shown a top view schematic representation of a detection system 10, according to an embodiment. The metasurface 102 portion of the meta-electrode 108 is adjacent the microfluidic channel 304 (not shown) of the microfluidic chamber 302. As a result, the metasurface 102 is exposed to the cell solution pumped through the microfluidic channel 304, while IR spectra of pixels are collected in reflection mode through the substrate 104. Each metasurface pixel has two long electrode wires 106 running through it, as shown in FIG. 6. These wires 106 are connected to two buses with each adjacent wire connected to a different bus. The wires 106 from the buses run to contact pads 112 at an outer edge 114 of the substrate 104, as also shown in FIG. 6. In the embodiment depicted in FIG. 6, the substrate 104 is rectangular and the contact pads 112 are in corners of $CaF_2$ substrate 104. Turing back to FIG. 10, cables 12 from a function generator 14 are connected to the wires 106 attached to the contact pads 112, transmitting a sinusoidal AC signal to the electrode wires 106 within the metasurface 102, creating non-uniform electric fields in the microfluidic channel 304 for cell capturing.

The live cells are then flown into the microfluidic chamber 302 through polyethylene tubing 16 using a syringe pump 18. The AC voltage is turned on as soon as the flow of cells begins and as a result, the cells start attaching to the meta-electrode 108 (at the metasurface 102). The cells move inside the microfluidic chamber 302 according to the dielectrophoretic force given by the following expression:

$$\vec{F}_{DEP} = 2\pi R_{cell}^3 K_{re}(f) \vec{\nabla} |\vec{E}_0|^2 \quad (1)$$

An important property of the Clausius-Mossotti factor $K_{re}$(f) is that it changes sign at $f=f_0$, where the crossover frequency $f_0$ is determined by the cell's geometry (e.g., by how folded is the cellular membrane) and by the conductivity of the surrounding fluid. On the practical level, the crossover frequency is simply measured experimentally for different cell types and tabulated. The AC voltage is chosen in such a way ($f>f_0$) that the cells placed in strong field gradient are attracted to the high-field region, i.e. to the meta-electrode 108. The fluid is chosen to have the conductivity a much lower than that of the cellular cytoplasm. In one embodiment, the fluid comprises ultrapure water (resistivity >18 MΩ·cm) with 280 mM of sucrose and 1:20 PBS added. In that embodiment, the conductivity of the DEP solution is approximately 780 µS/cm, but other combinations can be used. It is important, however, to maintain the appropriate osmolarity of the DEP solution so as to prevent rapturing cellular membranes. Nevertheless, live cells cannot be kept in the DEP solution for long periods of time. Therefore, spectroscopic measurements must be executed quickly, i.e., less than 30 minutes.

Figure 17:
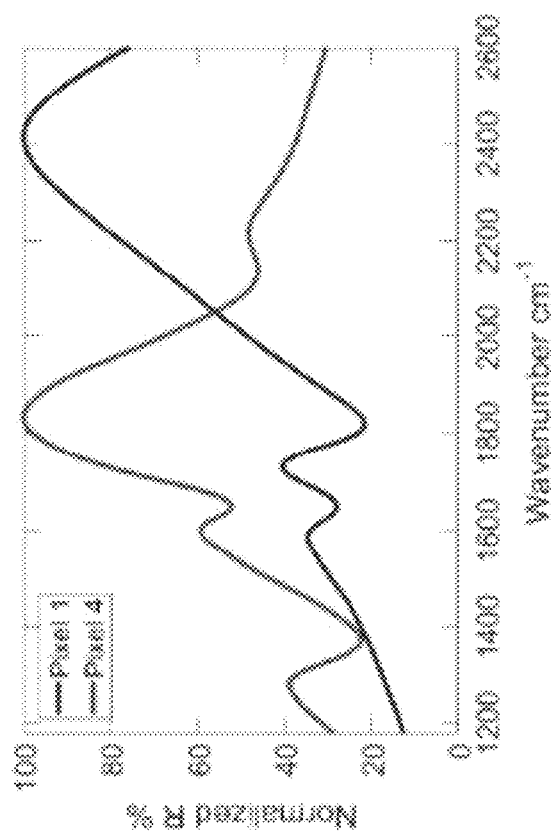
FIG. 17 is a graph of the typical spectra of cells placed on different pixels of the metasurface.
Figure 18:
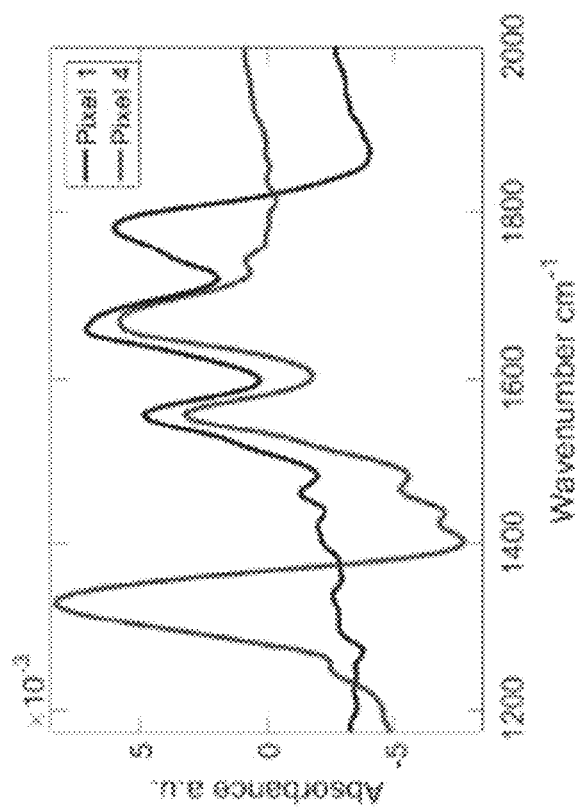
FIG. 18 is a graph of the absorbance calculated from the spectra in FIG. 17.

As mentioned above, the detection device 300 can be used with the remainder of the detection system 10 to collect the spectra of live cells. The spectra are collected using the method of Metasurface-Enhanced Infrared Reflection Spectroscopy (MEIRS). The metasurface 102 is pixelated, meaning that it consists of patches with different antennas that are resonant at different MIR frequencies. Pixilation enables concentration on different spectral regions in order to achieve the best possible sensitivity of the spectroscopic cytopathology. FIG. 17 shows an exemplary spectra of cells placed on different pixels of the metasurface 102. The metasurface resonant features are visible, but cell molecular vibrational modes are hard to discern. FIG. 18, however, shows the absorbance calculated from the spectra in FIG. 17, which makes the vibrational lines more clearly visible. Prior to analysis using MEIRS, the live cells must be prepared for use for the detection system 10.

In order for the DEP approach to work, cells must be suspended in a special solution (DEP solution) prior to all experiments and analysis. The DEP solution consists of ultrapure water (resistivity >18 MΩ·cm) with 280 mM of sucrose and 1:20 PBS added. In an exemplary embodiment, the conductivity of the DEP solution is adjusted to 780 µS/cm. The original cell suspension (in cell culture medium) is centrifuged at 2000 rpm for 2 minutes to pellet the cells. Supernatant is discarded and 2 mL of the DEP solution is added, and the solution is centrifuged again. Finally, the supernatant is discarded and 1 mL of the DEP solution is added. The final cell solution is transferred into a 500 µL glass syringe 18 (FIG. 10). Upon transference of the final prepared cell solution to the syringe 18, the spectroscopic measurements must be carried out immediately. The total time cells spend in the DEP solution, from the initial suspension to the end of the method, is kept under 20 minutes.

Other approaches to moving the cells from the cell culture medium to the DEP medium that do not require cell centrifugation have been contemplated. Therefore, the exact manner in which the cells are transferred from their growth medium into the DEP medium for measurements can differ. However, the transfer must be accomplished relatively fast, without having the cells spend a significant amount of time immersed in the DEP medium prior to the spectroscopic measurements.

Figure 12:
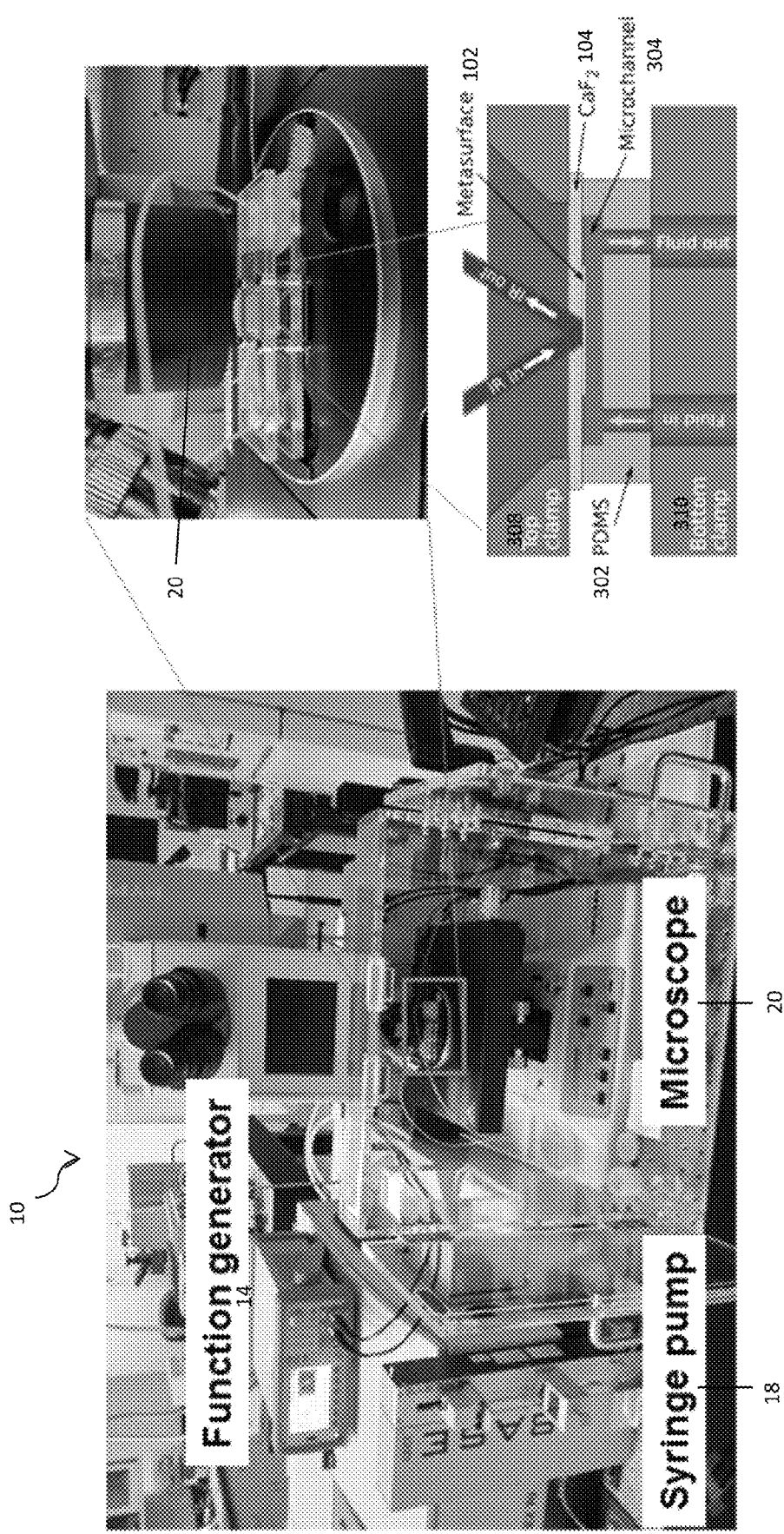
FIG. 12 is a perspective view schematic representation of the detection system, according to an embodiment.

Turning now to FIG. 12, there is shown a schematic representation of the detection system 10, according to an embodiment. With the cells prepared as described above, the cells can be captured from a flow using DEP. The syringe pump 18 is used to inject the cell solution into the microfluidic channel 304 at a constant flow rate (0.01 µL/s for this embodiment, although it could be higher or lower, depending on parameters, such as the applied AC voltage, the depth of the channel, etc.). In the embodiment, the microfluidic channel 304 has been primed with the DEP solution prior to cell injection. Sinusoidal AC signal is applied to the electrodes 106 embedded within the metasurface 102 using a function generator 14. Each electrode 106 is connected to its own signal channel and the voltages on each channel are π/2 out of phase. In an embodiment, two different voltages are used: 10 Vpp and 14 Vpp and the channel width (500 µm) is much larger than its depth (64 µm).

Figure 14:
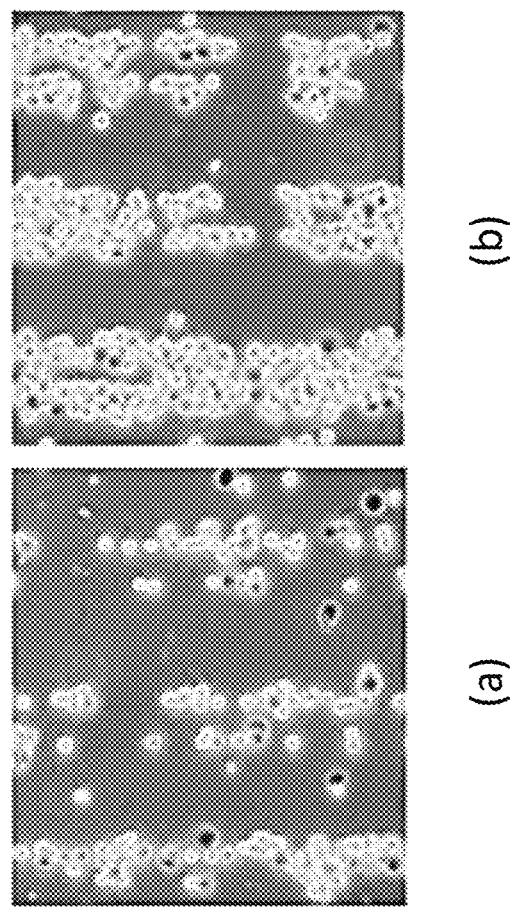
FIG. 14 shows photographs of HCT116 cells and A431 cells.
Figure 15:
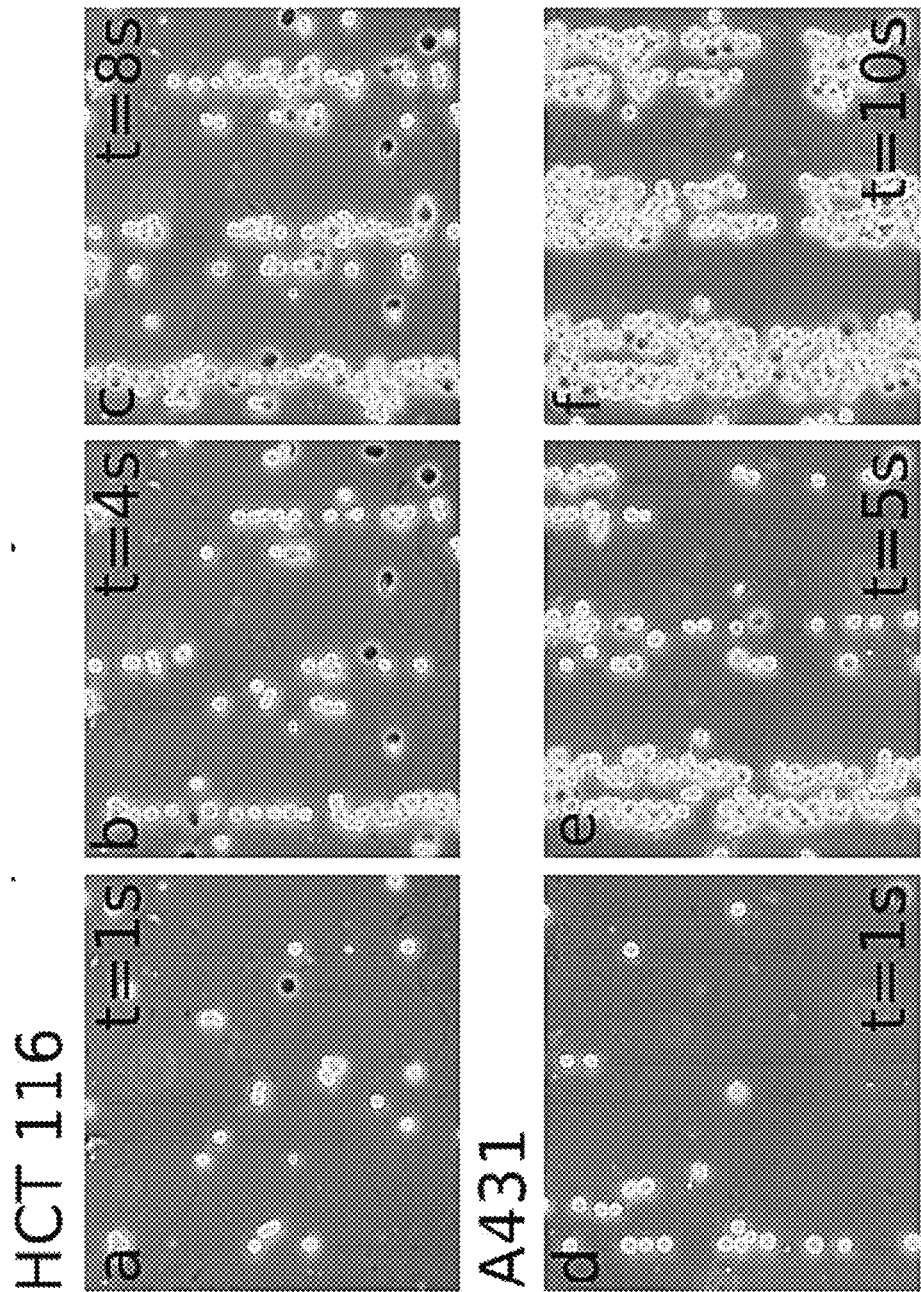
FIG. 15 shows images of HCT116 cell lines and A431 cell lines captured using phase-contrast microscopy.

The detection device 300 is mounted onto a microscope 20 (also shown in FIG. 10). In the depicted embodiment, the microscope 20 is an Olympus IX73 inverted microscope with a 10× objective. A video camera (not shown) or other imaging device is used to capture the image data. In an embodiment, the video camera is a Panasonic DMC-GH4 video camera. Images of DEP-captured cells are shown in FIGS. 15(a)-15(f). (Note, only wire electrodes 106 were present on the $CaF_2$ substrate 104 used to generate the images in FIG. FIGS. 15(a)-15(f), as the plasmonic metasurface 102 plays no role in facilitating electric field generation and hence in no way affects the DEP force. It was advantageous to have only wire electrodes 106 for clarity in imaging.) FIGS. 14(a) and 14(b) shows two types of cancer cells obtained from the standard cell lines: HCT116 and A431, respectively, on the metasurface 102. As can be clearly observed from FIGS. 15(a)-15(f), large numbers of cells are captured within seconds of the application of the AC field.

The A431 and HCT 116 cells collected onto the metasurface 102 pixel wire electrodes 106 are shown on FIGS. 15(a)-15(f). The cells are attracted onto the meta-electrode 108, forming lines at the wire locations. More cells are trapped by the electrodes 106 closer to the inlet port. Due to the high number of cells, it can be seen that the first electrodes 106 get saturated with cells and no more of them can fit on the surface in these areas. This causes some of the cells to be captured by the next pixel electrodes 106, because the DEP force is not strong enough to hold multiple cells piled up on top of each other and the fluid flow carries them to the adjacent pixels.

The cells mostly land directly on top of the wires 106, just as seen from the particle trajectories in the simulations, but drift farther down the metasurface 102 in the flow direction to an equilibrium position about one cell radius away from the wire. Most cells also appear to be grabbing on to the metasurface 102 after the initial landing. Within tens of seconds the cells drift to the equilibrium position, but stay there afterwards, even when DEP force is turned off. A majority of the attached cells can still be removed from the metasurface 102 when low frequency electric field is applied to the wires 106, resulting in repelling negative DEP force, or when fluid flow rate is significantly increased.

Next, despite the rapid speed at which the cells are captured by DEP forces, the cells are spectroscopically interrogated. All previous approaches to spectroscopic cytopathology required that the cells adhere to the surface for a relatively long time. According to this method, there is no need to wait for the cells to spread. Instead, their metasurface-enhanced IR spectra can be collected continuously in time, as more cells get attached to the meta-electrode 108. In an exemplary embodiment, for the full capturing and spectral measurement of the cells, the detection device 300 is fitted under a Bruker Hyperion 3000 IR microscope 20, as shown in FIG. 12. The microscope 20 is equipped with a 15× Cassegrain objective, and the mid-IR reflection spectra is collected with a liquid nitrogen cooled MCT detector (not shown). The IR microscope is coupled to Bruker Vertex 70 spectrometer fitted with KBr beamsplitter (not shown). The spectrometer, microscope 20, and sample stage enclosure 22 (FIG. 12) are constantly purged with dry air. Data is collected in the range of 600-7000 cm$^{-1}$ at 16 cm$^{-1}$ spectral resolution. In the exemplary embodiment, 128 averages are taken for background measurements on a gold mirror and 32 averages for collecting cell spectra. The cell spectra are continuously measured and averaged (32 averages). Video of the sample area is recorded for collecting visual images and correlating that information with spectral data. Individual keyframes are extracted from the video and areas with cells are masked out to calculate the metasurface 102 area covered with cells. Temporally separated (time series) absorbance spectra are calculated from the measured cell reflection spectra. Reflection spectrum $R_0(\omega)$ measured right before the cells entered the microfluidic channel 304 is used as the reference, and the quantity referred to as absorbance $A(\omega)$ is calculated for each following reflection spectrum $R_i(\omega)$ using the following formula:

$$A = -\log\left(\frac{R_i}{R_0}\right) \quad (2)$$

The region containing amide I and amide II vibrational lines is used to evaluate the accumulation of cells on the sensing surface 102. This spectral region is separated from the rest of the data, baseline corrected, and the total area under the emerging spectral features is calculated for each point of the time series. The spectral region of the Fano resonance is used in a similar fashion to assess the number of cells on the metasurface 102, and is correlated with the video recording of the attaching cells. Even though the entire IR spectra across the mid-IR fingerprints range (1,000 cm$^{-1}$<$\omega$<2,000 cm$^{-1}$) are collected, the most prominent spectral features of cells: the amide I ($\omega_I$~1660 cm$^{-1}$) and the amide II (con 1560 cm$^{-1}$) vibrational modes characteristic of cell's proteins are initially focused on for the purposes of explaining the method. Because the frequency-dependent refractive index of the cells is not very different from that of water, and because the cell coverage is not very high, the changes in the metasurface reflection spectra $R_i(\omega)$ produced by the attachment of individual cells are small and difficult to observe directly from those spectra. However, the spectral features of the cells become visible when absorbance $A(\omega)$ is calculated using Eq. (2).

Figure 16:
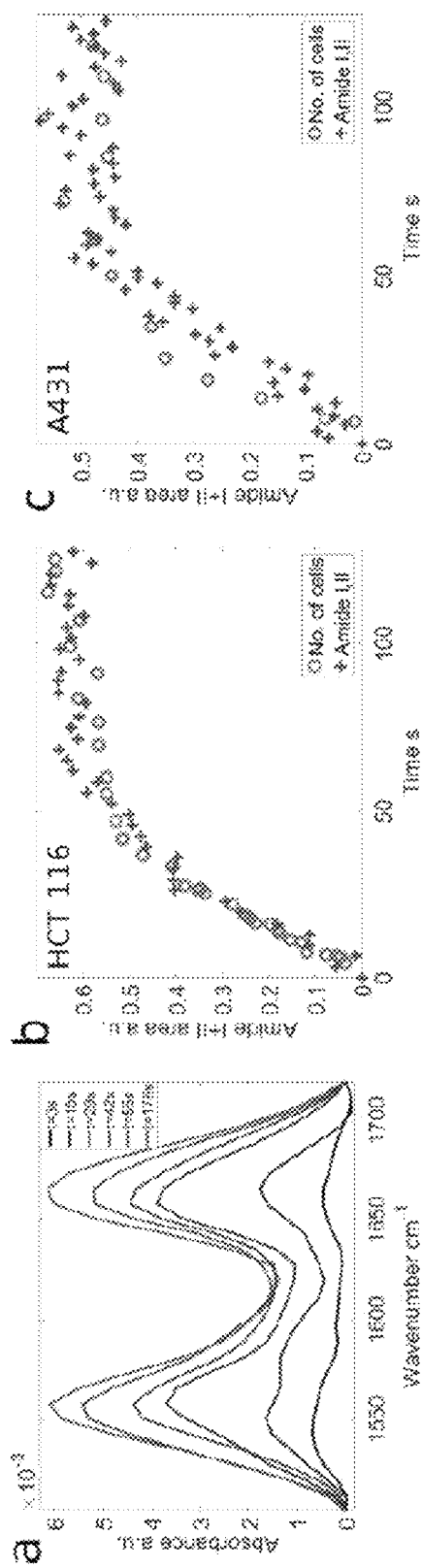
FIG. 16 shows graphs of the absorbance spectra as a function of time produced by the cells attracted from the flow and attached to the metasurface.

An example of the emerging amide I and II features in the baseline corrected absorbance spectrum with the addition of HCT 116 cells is shown on FIG. 16(a). The total area under amide I and II features in the absorbance spectra correlates well with the total area of the metasurface covered with cells, as seen from the images collected together with the spectra (FIGS. 16(b) and 16(c)). This confirms that (i) the observed spectral features indeed arise from the cells, and (ii) that the magnitude of the absorbance features is linearly dependent on the number of cells attracted to the meta-electrode 108.

Figure 19:
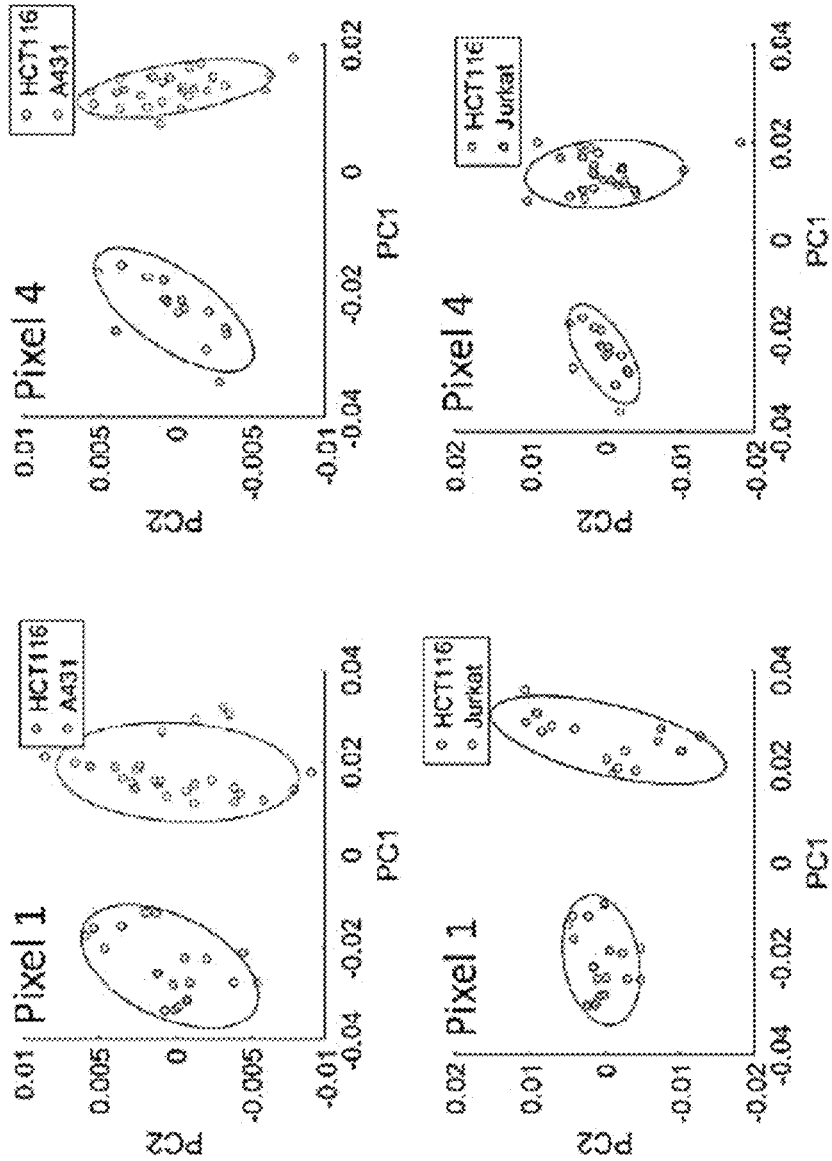
FIG. 19 shows graphs of the clusters of HCT116, A431, and Jurkat cell lines determined by PCA.

Next, the spectral signal collected from three different cell lines (corresponding to different cancers) can be used to differentiate between them. This is the key to spectroscopic cytopathology: no staining of the cells or inspection of the cells' morphological features is necessary. The only distinguishing biomarkers are the vibrational spectral features of the absorptivity $A(\omega)$. In order to quantitatively compare different cancer cells that are suspended in the DEP solution and injected into the microfluidic chamber 302, their full spectra is analyzed using chemometrics. Specifically, the Principal Components multivariate Analysis (PCA) is carried out for several distinct cancer cells: HCT116 (colon cancer), A431 (skin cancer), and Jurkat (T cell leukemia) in an exemplary embodiment. HCT116 and A431 are adherent epithelial cells, whereas Jurkat is a non-adherent lymphocyte cell. While spectral differentiation between attached (live or fixed or dried) cells is quite common, and actually constitutes the basis of spectroscopic cytopathology, the detection system 10 enables differentiation between cells that are obtained directly from the flow by DEP attraction. FIG. 19 shows graphs of the PCA analysis for the HCT116 (colon cancer), A431 (skin cancer), and Jurkat (T cell leukemia) cancer cells. In the top row, HCT116 cell lines are clustered to the left, separate from the cluster of A431 cell lines. Similarly, in the bottom row, HCT116 cell lines are clustered to the left, separate from the cluster of Jurkat cell lines.

The detection device 300 and detection system 10 are also suitable for the real-time IR measurement of cells, particularly for drug-monitoring applications. The MEIRS analysis described above can also be used to monitor the effect of drugs on cells in real-time. Generally, MEIRS is used to monitor a single or a group of cells on a metasurface 102 and monitor their change in real-time as different drugs are administered. Tracking spectroscopic changes in real-time allows for the observation of effects that are not available from end-point measurement, such as the rate of drug uptake and how fast the cells respond to a drug targeting a certain pathway. This can be in turn related to the mode of action of the drug under consideration.

The following method is used for monitoring a drug's effect of the cells. The method can be implemented using the same or similar detection unit 100, detection device 300, and detection system 10, as described above and shown in FIGS. 1 and 2-12. First, the metasurface 102 is assembled with the microfluidic chamber 302, and the cells are seeded on the metasurface 102 in culture media. The cells are then incubated until they are well-adhered on the metasurface 102. The metasurface 102 (with cells) is then transferred to a FTIR microscope 20 for continuous collection of IR spectra. Background spectra of the cells are collected for some time, before the drug to be tested is introduced to the cells via a microfluidic pump (such as a syringe pump 20 like that shown in FIG. 12). The cell's IR spectra are then collected for several hours to a few days depending on how fast the drug is expected to act on the cells. In this measurement, the IR spectrum are predominantly collected from the cell membrane and the regions close to the cell membrane (such as cytoskeletons and focal adhesions). Following data collection, statistical, or machine learning techniques are used to compare the cells' response to the tested drug to those in an already-established library and assign the new drug to a particular group of drugs with known mode of action. This allows for an inference of the mode of action of the new drug.

To implement this, the target cells need to be kept under physiological conditions while the measurement takes place. The cell's response can be as fast as a few hours for drugs that induce cytoskeletal rearrangement (that affect adhesion and cellular morphology) to several days for drugs that induces/suppresses protein expression or those that affect cell viability. We plan to design a mini-cell incubator/measurement chamber that can be placed on a FTIR-coupled IR microscope to maintain 37° C. and 5% $CO_2$ level throughout the spectroscopic measurement. This chamber 302 must have a fluidic interconnect that can be connected to either a syringe pump 18 or peristaltic pump to inject different drugs as well as running a buffer to the chamber 302.

A statistical analysis script can be used to identify spectral changes of the cells as they happen in real time. This is based on multivariate statistical analysis techniques such as Principal Component Analysis (PCA), Linear Discriminant Analysis (LDA), and Partial Least Square Discriminant Analysis (PLS-DA), already widely used for exploratory and explanatory analysis of spectroscopic data. These analysis techniques can be used to identify how the protein and lipid contents of the cells change as a drug is administered, as well as how differently the cell responds to different drugs.

The plasmonic metasurface 102 used for MEIRS is fabricated by creating a patterned gold nanostructure on top of a 12.5 mm×12.5 mm $CaF_2$ substrate 104. Briefly, the structure (detection unit 100) is defined on PMMA resist using e-beam lithography. 10 nm chromium adhesion layer followed by 70 nm gold layer are deposited onto the resulting structure using e-beam evaporation. The device is then soaked in acetone overnight for lift-off, resulting in the final pattern of gold on $CaF_2$.

The metasurface 102 design supports two resonances, and the spectral position of these two resonances can be tuned independently to match the molecular vibration of interest. For application with the spectroscopy of live cells, the two resonances are tuned to match the amide I and II vibrations from proteins and $CH_2$ vibrations from lipids, which are roughly located at 1500-1700 $cm^{-1}$ and 2800-3000 $cm^{-1}$, respectively. Aside from enhanced IR absorption provided by the nanoantennae on the metasurface 102, these nanoantennae also act as optical resonators, and a shift of metasurface resonance can be related to the change in local refractive index from the presence of cells.

Figure 11:
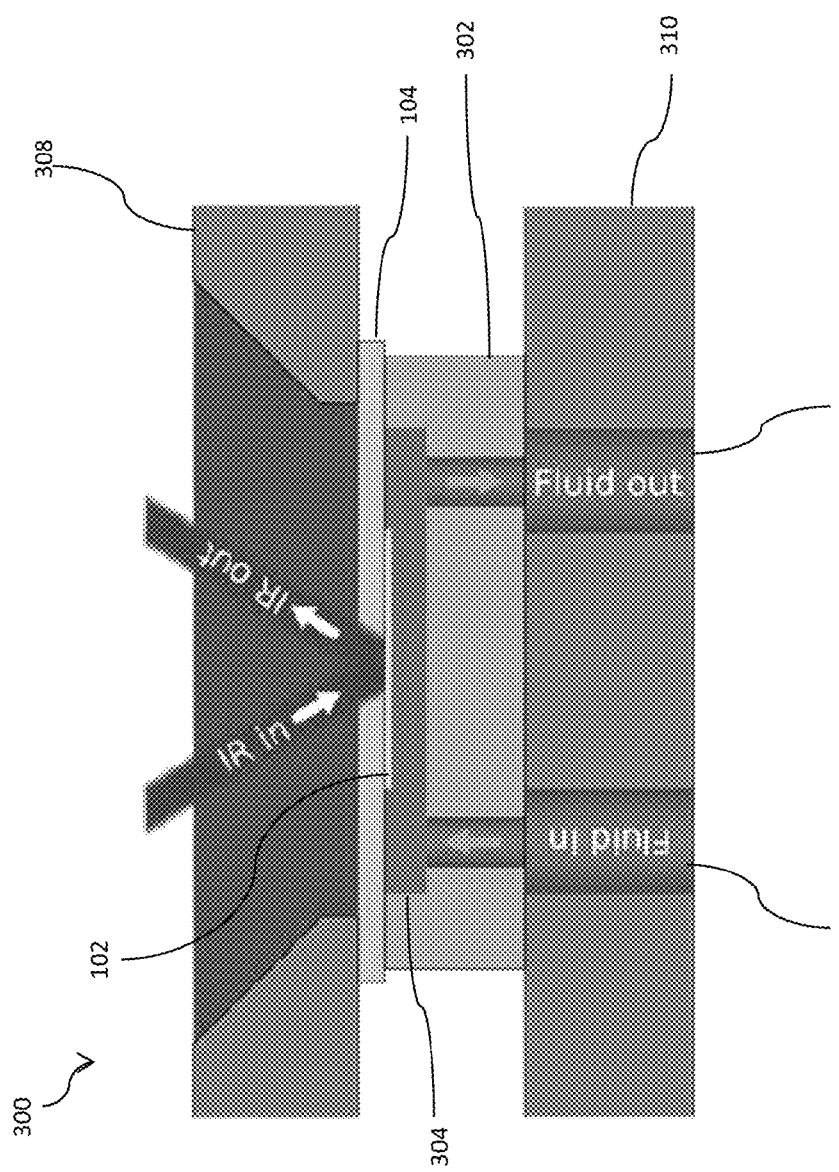
FIG. 11 is a side view schematic representation of the detection device, according to an embodiment.

The plasmonic metasurface 102 fabricated on $CaF_2$ substrate 104 is combined with a microfluidic chamber 302 fabricated with PDMS, as shown in FIG. 11. The PDMS chamber 302 is mechanically clamped onto the metasurface 102 by two acrylic clamps, fixed by screws (FIG. 9). Further, two holes are punched onto the PDMS chamber 302 for fluid injection. Plastic tubing is connected to these holes for the injection of cell suspension, running buffer, and drugs using a syringe pump 18. It is contemplated that the current stage is modified with the addition of a temperature and $CO_2$ controller.

The assembled detection unit 100 integrated with a prototype PDMS chamber 302 was used to monitor the adhesion of HeLa cells on fibronectin-coated metasurface 102. Prior to plating cells on the metasurface 102, the metasurface 102 was incubated in 50 μg/mL fibronectin for 2 h at 37° C. to improve cell adhesion to the metasurface 102. In exemplary embodiments, the measurements are done at room temperature without $CO_2$ control over the duration of approximately two hours (which can also be conducted in a mini-incubator). The measurements are done at room temperature instead of 37° C. It is expected that the metabolism of the cell is somewhat slowed down and cell adhesion to the metasurface 102 would be slower but otherwise similar to it would be at 37° C. In an embodiment, HeLa cells are originally cultured in a standard cell incubator in DMEM, supplemented by 10% fetal bovine serum (FBS). The cells are harvested by trypsinization and are suspended in DMEM. To seed the cells, the cell suspension is injected into the PDMS chamber 302 using a syringe pump 18 while the cells on metasurface 102 were monitored with Olympus IX73 inverted microscope to ensure enough cell coverage on the metasurface 102. Cells are incubated for 10 minutes with the chamber 302 in an upright position before it was inverted and transferred to Bruker Hyperion 3000 microscope 20 for measurement. A 64×64 IR focal plane array, which covers an approximately 200 μm×200 μm region on the metasurface 102, was used to map the metasurface-enhanced IR absorption from the attached cells.

Figure 20:
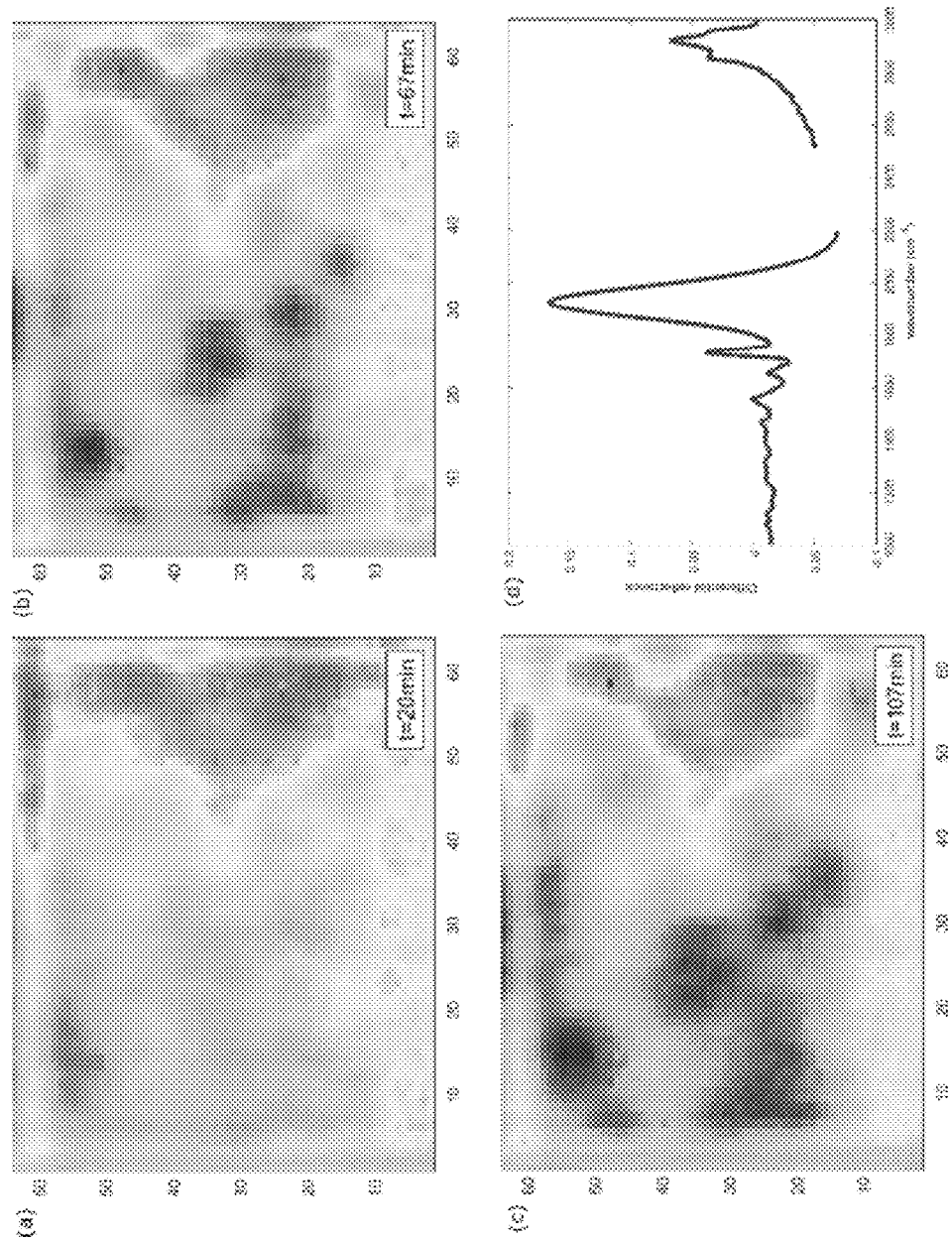
FIG. 20 shows images of IR spectral mapping and a graph of the IR absorption spectrum.

Referring now to FIG. 20, the result of the FPA measurement is shown. The raw data are processed by principal component analysis, and the mapping of the score of the component that corresponds to IR absorption of cells are shown in FIGS. 20(a)-20(c), while the loading of this component is shown in FIG. 20(d). Area of the metasurface 102 covered by cells can be identified as the blue regions in FIG. 20(a)-20(c). At t=20 min, cells are only weakly adhered onto the metasurface 102. As time passes, the cells adhere more strongly and spread out, resulting in stronger IR absorption. The cell's IR absorption spectrum can be seen from FIG. 20(d); amide I (1650 $cm^{-1}$) and amide II (1550 $cm^{-1}$) absorption peaks from proteins can be identified, as well as several peaks from lipid around 2900 $cm^{-1}$. The large peak near 1900 $cm^{-1}$ results from the shift of metasurface resonance, which arises from the dynamic mass redistribution of cells, analogous to the signal measured by optics-based phenotypic assays.

Figure 21:
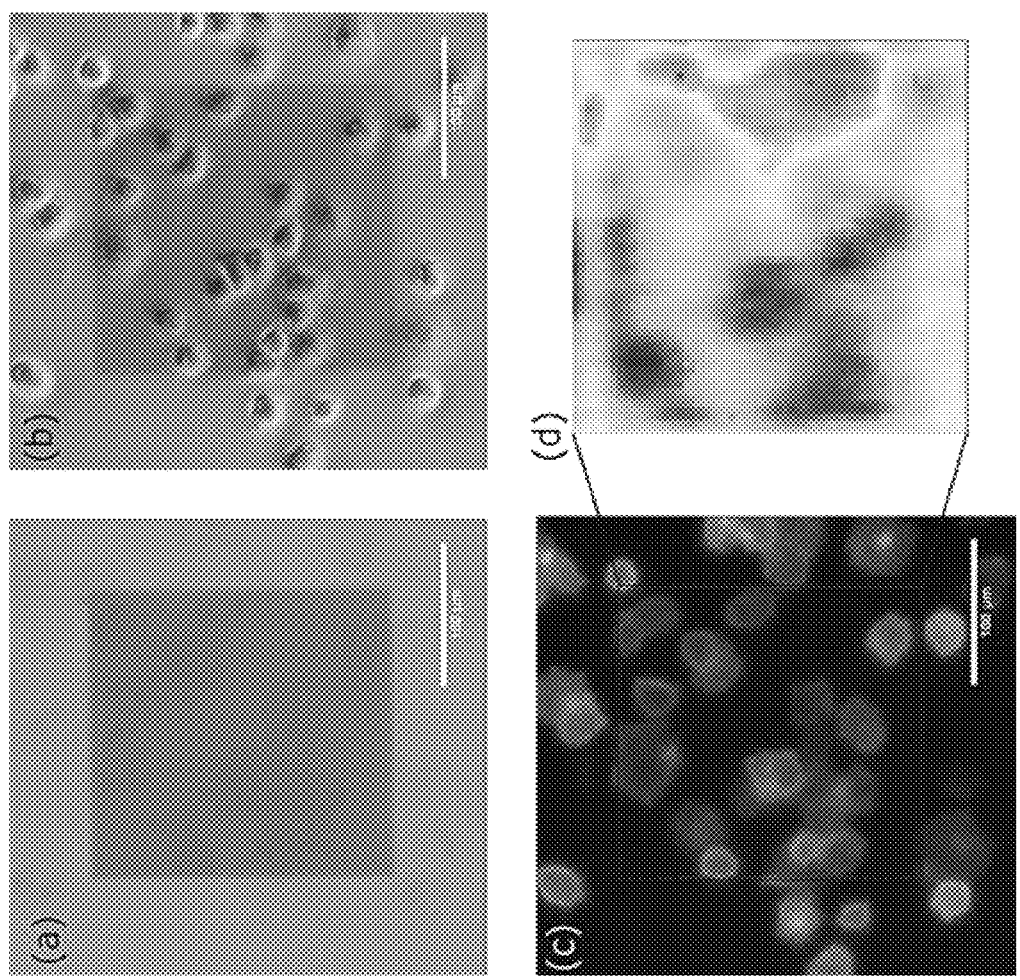
FIG. 21 shows microscopy images of HeLa cells on a metasurface.

To see how the spectral mapping of cells measured by MEIRS correlates with the actual distribution of cells, microscopy images of the HeLa cells on metasurface are taken with bright field (FIG. 21(a)), phase contrast (FIG. 21(b)), and epi-fluorescence with phalloidin-Alexa 488 stain (FIG. 21(c)), which stains for the actin filaments in the cells. The resolution of FPA mapping is approximately 10 μm, likely limited by aberration in the optical system. The cells are clearly visible from both phase contrast and epi-fluorescence, and the spatial distribution of these cells agree with each other, as well as that obtained from FPA mapping, shown in FIG. 21(d). Note that in addition to being able to identify the location and morphology of the cells, the contrast in FPA mapping reflects the degree of cell adhesion to the underlying substrate, thus it provides additional information not available from microscopy alone.

Figure 22:
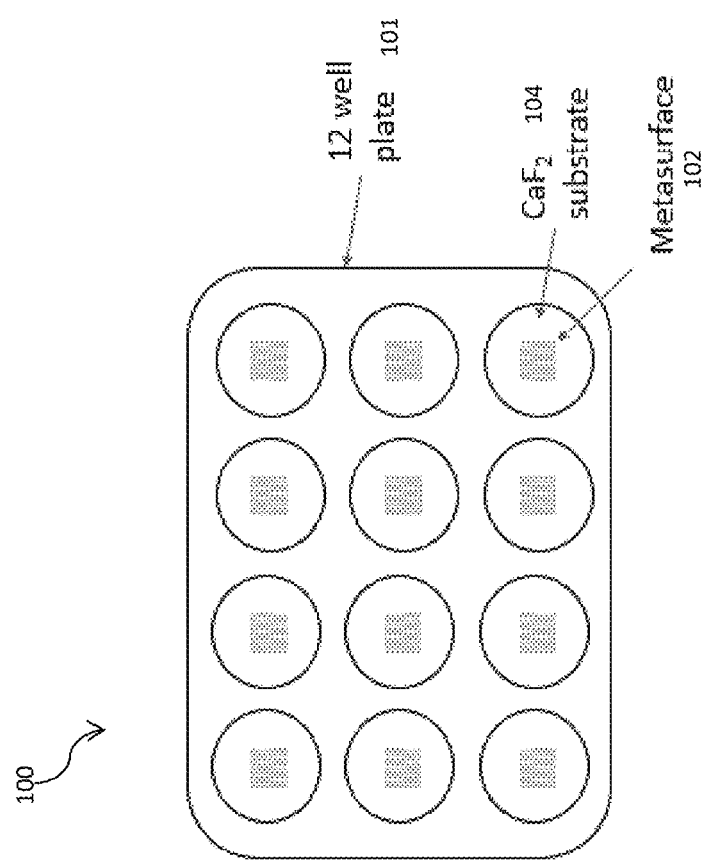
FIG. 22 is a top view schematic representation of a detection unit, according to an alternative embodiment.
Figure 23:
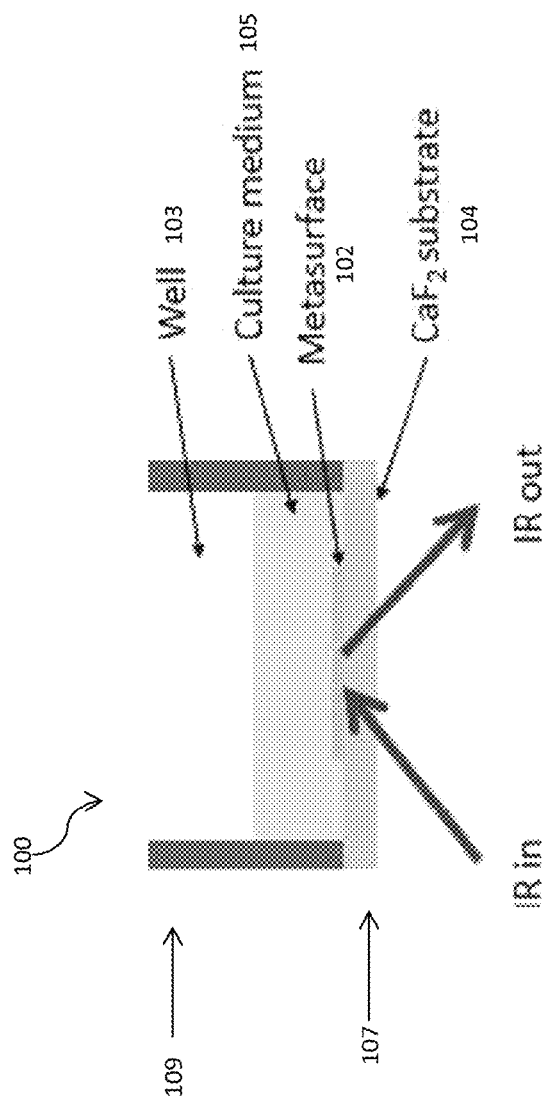
FIG. 23 is a side view schematic representation of a well of the detection unit in FIG. 22.

Turning now to FIGS. 22 and 23, there is shown a top view and a side view, respectively, of a detection unit 100, according to an alternative embodiment. As shown in FIG. 22, the detection unit 100 comprises a holding device 101, such as a well plate. In FIG. 22, the holding device 101 is a multiwell microplate, specifically, a 12-well microplate. Multiwell microplates are potentially more suitable for MEIRS for high-throughput screening. As shown in the embodiment in FIG. 23, the metasurface 102 is fabricated on a $CaF_2$ substrate 104 attached to a standard microplate 101. In particular, the microplate 101 does not have a traditional plastic bottom. Instead, each well 103 of the microplate 101 has the $CaF_2$ substrate 104 at the bottom 107 of the microplate 101 and the metasurface 102 is facing toward the open end 109 of the well 103. As shown in FIG. 23, a culture medium 105 (for a sample, e.g., cells) is placed in each well 103 above the metasurface 102. In use, the metasurface 102 is probed from the bottom (i.e., toward the $CaF_2$ substrate 104) using an inverted IR-coupled microscope 20, (FIG. 12) while media 105 and drug samples (not shown) are introduced into each well 103 through pipetting. The detection unit 100 in FIGS. 22 and 23 can be integrated with components such as the microfluidic chamber 302 and microscope 20 as described above to form a detection device 200 and/or system 10.

Figure 24:
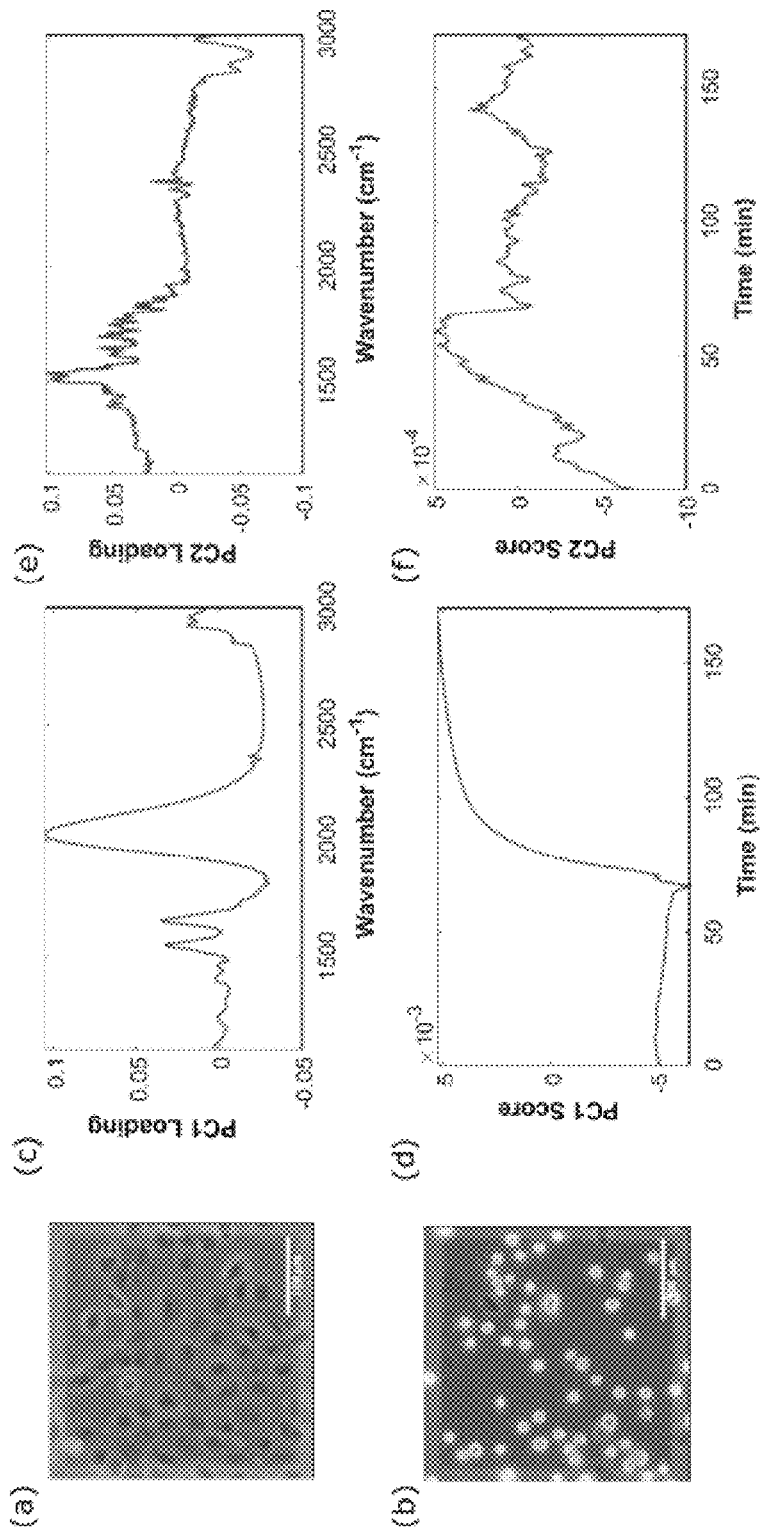
FIG. 24 shows contrast micrscopy images of A431 cells on a metasurface and graphs of the resulting PCA scores/loading obtained from the spectra.

Referring briefly to FIG. 24, there are shown contrast microscopy images of A431 cells on the metasurface 102 and graphs of the resulting PCA scores/loadings obtained from their spectra. The most robust adhesion-related effects, such as trypsinization (i.e., the detachment of adherent cells from the metasurface 102 by application of trypsin, a proteolytic enzyme that breaks down adhesion proteins), can be easily detected using MEIRS. In this example, A431 cells were subjected to 0.025% trypsin at t=66 min. Reflection spectra were analyzed using principal components analysis (PCA). Image (a) shows A431 cells prior to the introduction of trypsin and image (b) shows the A431 cells after the introduction of trypsin. Most of the variation is captured by the first principal component (PC1) (images (c) and (d)); the time evolution of the PC1 score shown in image (d), which shows rapid detachment of the cells between t=66 min and t=100 min, with a time resolution of Δt=1 min. The spectral loading of PC1 shown in image (c), which shows that trypsinization is related to the cellular dissociation from the sensor because of the clear contribution of the vibrational lines characteristic of cellular proteins and lipids: Amides I and II at $\omega_{AI} \approx 1640$ cm$^{-1}$ and $\omega_{AII}$ 1550 cm$^{-1}$, C—H asymmetric vibrations and bends at $\omega_{C-H}^{as} \approx 1450$ cm$^{-1}$ and $\omega_{C-H}^{bens} \approx 1380$ cm$^{-1}$ (lipids and proteins), asymmetric phosphate stretch at $\omega_{PO^{2-}}^{as} \approx 1250$ cm$^{-1}$ (phospholipids), and lipid-related C—H modes around $\omega_{C-H}^{lipid} \approx 3,000$ cm$^{-1}$. The strongest spectral feature at $\omega_{ant} \approx 2,000$ cm$^{-1}$ is antenna resonance of the metasurface. The magnitude of the response at $\omega_{ant}$ is attributed to refractive index change and provides similar signal to an optical grating based cellular assays.

Figure 25:
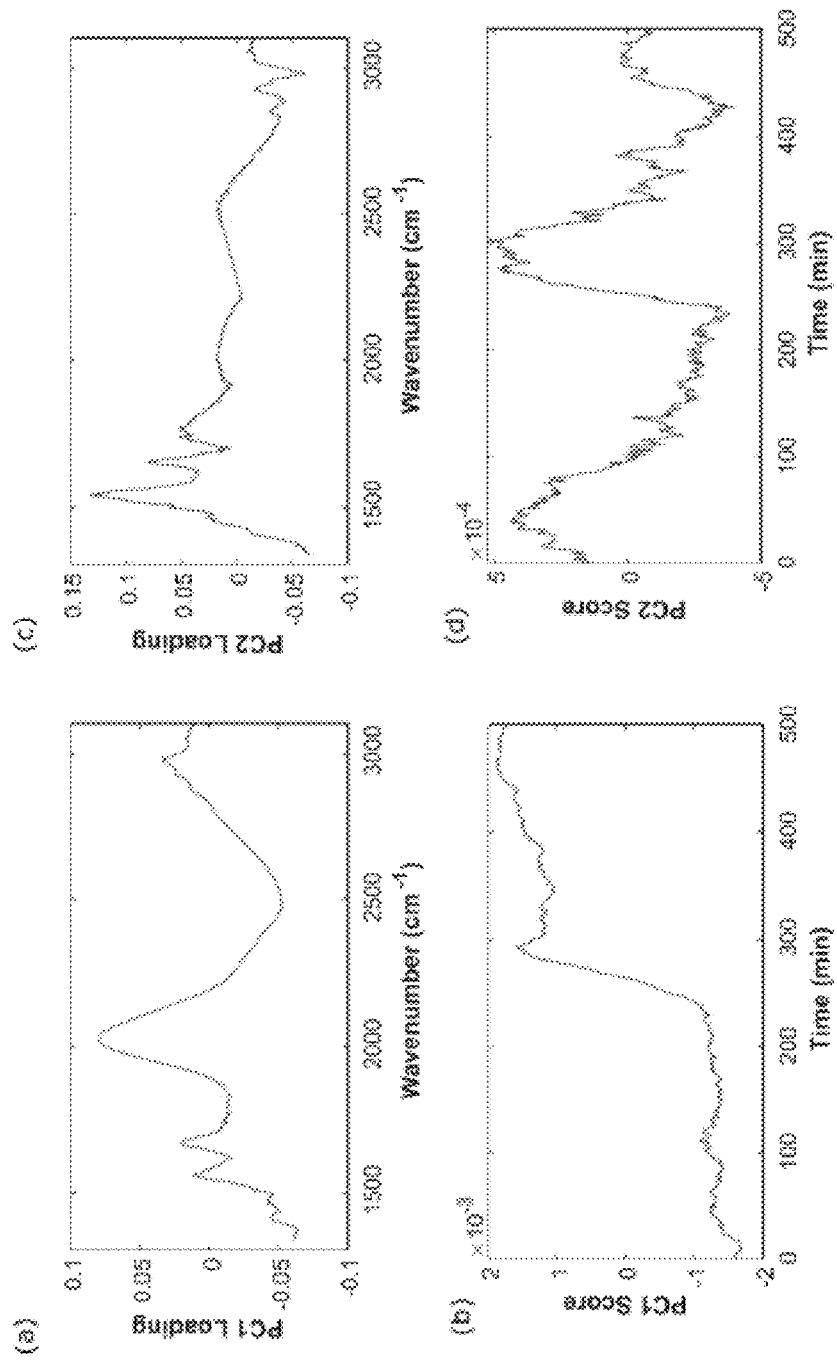
FIG. 25 shows graphs of the resulting PCA scores/loading obtained from A431 cells with the addition of epidermal growth factor (EGF).

Referring briefly to FIG. 25, there are shown graphs of the resulting PCA scores/loadings obtained from A431 cells with the addition of epidermal growth factor (EGF). In this example, MEIRS is used to measure the response of A431 cells to epidermal growth factor (EGF). Specifically, 40 nM EGF was injected to the microfluidic measurement chamber 302 at t=240 min., while continuously monitored with time resolution of Δt=1 min. The measured reflectance spectra were analyzed using PCA. Both the first (PC1) (images (a) and (b)) and the second principal component (PC2) (images (c) and (d)) contain a signal related to the cell's response to EGF. While the PC1 score (image (b)) shows a permanent change to the cell, PC2 score (image (d)) recovers to the baseline level before the EGF injection after about 200 min. Although the biological interpretation of such signal is still not clear, it is hypothesized that the measured response corresponds to at least two processes in the cell, likely related to the cells' cytoskeletal reorganization in response to EGF.

All definitions, as defined and used herein, should be understood to control over dictionary definitions, definitions in documents incorporated by reference, and/or ordinary meanings of the defined terms.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. A detection unit, comprising:
a first layer comprising an IR-transparent substrate having a first side and a second side;
a second layer comprising a plasmonic metasurface having a first side and a second side, the first side of the plasmonic metasurface being disposed directly adjacent at least a portion of the second side of the IR-transparent substrate, the plasmonic metasurface comprising an array of metallic plasmonic conductive elements;
a holding component configured to hold the IR-transparent substrate; and
a channel to hold a fluid, wherein the channel is under the first layer and the second layer and above at least a portion of the holding component,
wherein the IR-transparent substrate of the first layer and the plasmonic metasurface of the second layer comprise different materials,
wherein the IR-transparent substrate is configured to transmit an IR incident light from the first side of the IR-transparent substrate to the second side of the IR-transparent substrate and to transmit an IR reflective light reflected by the plasmonic metasurface from the second side of the IR-transparent substrate to the first side of the IR-transparent substrate,
wherein the second layer is configured to reflect a first portion of IR light by the plasmonic metasurface back to the IR-transparent substrate and to transmit a second portion of the IR light;
wherein the detection unit is configured to output for analysis reflectance spectra corresponding only to the first portion of the IR light.

2. The detection unit of claim 1, wherein the substrate is composed of $CaF_2$.

3. The detection unit of claim 1, wherein the metallic plasmonic conductive elements are gold nanoantennas.

4. The detection unit of claim 1, further comprising an AC source connected to the array of metallic plasmonic conductive elements.

5. The detection unit of claim 1, wherein the metallic plasmonic conductive elements are electrically-biased.

6. The detection unit of claim 1, wherein the metallic plasmonic conductive elements are attached to contact pads on the plasmonic metasurface.

7. A detection unit, comprising:
a first layer comprising an IR-transparent substrate having a first side and a second side;
a second layer comprising a plasmonic metasurface having a first side and a second side, the first side of the plasmonic metasurface being disposed directly adjacent at least a portion of the second side of the IR-transparent substrate, the plasmonic metasurface comprising an array of metallic plasmonic conductive elements; and
a holding component configured to hold the IR-transparent substrate;
wherein the IR-transparent substrate of the first layer and the plasmonic metasurface of the second layer comprise different materials,
wherein the IR-transparent substrate is configured to transmit an IR incident light from the first side of the IR-transparent substrate to the second side of the IR-transparent substrate and to transmit an IR reflective light reflected by the plasmonic metasurface from the second side of the IR-transparent substrate to the first side of the IR-transparent substrate,
wherein the second layer is configured to reflect a first portion of IR light by the plasmonic metasurface back to the IR-transparent substrate and to transmit a second portion of the IR light;
wherein the detection unit is configured to output for analysis reflectance spectra corresponding only to the first portion of the IR light; and
wherein the holding component is a multi-well microplate, and the IR-transparent substrate and the plasmonic metasurface attached to the IR-transparent substrate are within a well of the multi-well microplate.

8. The detection unit of claim 7, wherein the IR-transparent substrate comprises a bottom of the well.

9. The detection unit of claim 7, wherein the plasmonic metasurface is positioned above the IR-transparent substrate closer to an open end of the well.

10. The detection unit of claim 1, wherein the channel comprises a microfluidic channel adjacent to the plasmonic metasurface such that the microfluidic channel extends along the plasmonic metasurface.

11. The detection unit of claim 10, wherein the holding component comprises a top clamp attached to the substrate and a bottom clamp attached to the microfluidic chamber to hold the substrate and the microfluidic chamber together.

12. The detection unit of claim 11, wherein the top clamp and the bottom clamp are attached via one or more connectors.

13. The detection unit of claim 12, wherein the one or more connectors extend through the top clamp and the bottom clamp.

14. The detection unit of claim 10, further comprising an AC source connected to the metasurface.

15. A detection system, comprising:
a detection unit as recited in claim 7;
an AC source connected to the array of metallic plasmonic conductive elements in the plasmonic metasurface; and
a microscope positioned above the unit, the microscope configured to emit IR light or visible light, the IR-transparent substrate is configured to transmit an IR light incident from the first side of the IR-transparent substrate to the second side of the IR-transparent substrate and to transmit an IR reflective light reflected by the plasmonic metasurface from the second side of the IR-transparent substrate to the first side of the IR-transparent substrate, wherein the second layer is configured to reflect the first portion of IR light by the plasmonic metasurface back to the IR-transparent substrate for collection at the microscope.

16. The detection system of claim 15, further comprising a microfluidic pump connected to the microfluidic channel.

17. The detection system of claim 15, further comprising an imaging device connected to the microscope.

18. The detection system of claim 17, wherein the imaging device is configured to capture image data from the first portion of the IR light reflected from the plasmonic metasurface.

19. A detection system comprising the detection unit of claim 1 and a microscope configured to emit the IR light and collect the first portion of the IR light reflected.

20. The detection unit of claim 1, wherein the detection unit comprises no reflector plate for reflecting the second portion of the IR light passing beyond the second layer.

21. The detection unit of claim 1, wherein the conductive elements comprise metal wires.

22. The detection unit of claim 7, wherein the conductive elements comprise metal wires.

* * * * *